United States Patent
Maeda et al.

(10) Patent No.: US 11,735,708 B2
(45) Date of Patent: Aug. 22, 2023

(54) METHOD FOR MANUFACTURING ENERGY STORAGE DEVICE AND ENERGY STORAGE DEVICE

(71) Applicant: GS Yuasa International Ltd., Kyoto (JP)

(72) Inventors: Kazuto Maeda, Kyoto (JP); Hirokazu Kambayashi, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 626 days.

(21) Appl. No.: 16/075,520

(22) PCT Filed: Jan. 19, 2017

(86) PCT No.: PCT/JP2017/001821
§ 371 (c)(1),
(2) Date: Aug. 3, 2018

(87) PCT Pub. No.: WO2017/138323
PCT Pub. Date: Aug. 17, 2017

(65) Prior Publication Data
US 2019/0044105 A1    Feb. 7, 2019

(30) Foreign Application Priority Data
Feb. 9, 2016  (JP) ................. 2016-023143

(51) Int. Cl.
*H01M 4/13* (2010.01)
*H01G 11/74* (2013.01)
(Continued)

(52) U.S. Cl.
CPC .............. *H01M 4/13* (2013.01); *H01G 11/70* (2013.01); *H01G 11/74* (2013.01); *H01G 11/80* (2013.01);
(Continued)

(58) Field of Classification Search
CPC ............ H01M 2/06; H01M 2/08; H01M 2/26; H01M 2/0469; H01M 4/13; H01M 4/70;
(Continued)

(56) References Cited

U.S. PATENT DOCUMENTS 10,230,092 B2 * 3/2019 Koo ................ H01M 2/06
2006/0222938 A1 * 10/2006 Yoshioka ............ H01M 2/0413
429/174
(Continued)

FOREIGN PATENT DOCUMENTS

JP    2010-055786 A    3/2010
JP    2012-028246 A    2/2012
(Continued)

OTHER PUBLICATIONS

Machine Translation: WO 2017/110480 (2015).*
International Search Report (ISR) PCT Form PCT/ISA/210), in PCT/JP2017/001821, dated Feb. 21, 2017.

*Primary Examiner* — Stephen J Yanchuk
(74) *Attorney, Agent, or Firm* — McGinn I.P. Law Group, PLLC

(57) ABSTRACT

A method for manufacturing an energy storage device includes a swaging step in which a swaged portion is formed by swaging a tip portion, penetrating a positive electrode terminal or a positive electrode current collector and projecting in a predetermined direction from the positive electrode terminal or the positive electrode current collector, of a shaft portion. In the swaging step, the tip portion of the shaft portion is swaged by a punch which includes a pressing surface, the pressing surface including a punch-side first concave portion which is concaved in the predetermined direction and a punch-side second concave portion which is concaved in the predetermined direction more than the (Continued)

punch-side first concave portion at an inner peripheral side of the punch-side first concave portion.

19 Claims, 13 Drawing Sheets

(51) Int. Cl.
| | |
|---|---|
| *H01G 11/80* | (2013.01) |
| *H01G 11/70* | (2013.01) |
| *H01G 11/82* | (2013.01) |
| *H01M 50/15* | (2021.01) |
| *H01M 50/176* | (2021.01) |
| *H01M 50/186* | (2021.01) |
| *H01M 4/70* | (2006.01) |
| *H01G 11/84* | (2013.01) |
| *H01M 50/534* | (2021.01) |
| *H01M 50/533* | (2021.01) |
| *H01M 50/536* | (2021.01) |
| *H01M 10/0525* | (2010.01) |

(52) U.S. Cl.
CPC .............. *H01G 11/82* (2013.01); *H01M 4/70* (2013.01); *H01M 50/15* (2021.01); *H01M 50/176* (2021.01); *H01M 50/186* (2021.01); *H01G 11/84* (2013.01); *H01M 10/0525* (2013.01); *H01M 50/533* (2021.01); *H01M 50/534* (2021.01); *H01M 50/536* (2021.01)

(58) Field of Classification Search
CPC ........... H01M 10/0525; H01M 50/528; H01M 50/147; H01M 50/183; H01M 50/543; H01M 50/172; H01M 50/531; H01G 11/80; H01G 11/74; H01G 11/82; H01G 11/84; H01G 11/70
See application file for complete search history.

(56) References Cited

U.S. PATENT DOCUMENTS

| | | | |
|---|---|---|---|
| 2011/0076552 A1* | 3/2011 | Taniguchi | ........... H01M 50/567 429/181 |
| 2012/0231328 A1* | 9/2012 | Yamazaki | ............... H01M 2/08 429/174 |
| 2014/0023914 A1* | 1/2014 | Okutani | .............. H01M 50/155 429/179 |
| 2016/0181577 A1* | 6/2016 | Kajiwara | ............ H01M 50/528 429/179 |

FOREIGN PATENT DOCUMENTS

| | | |
|---|---|---|
| JP | 2016-091660 A | 5/2016 |
| WO | WO 2012/014510 A1 | 2/2012 |
| WO | WO2017/110480 | * 12/2015 |

* cited by examiner

METHOD FOR MANUFACTURING ENERGY STORAGE DEVICE AND ENERGY STORAGE DEVICE

TECHNICAL FIELD

The present invention relates to a method for manufacturing an energy storage device which includes a case, a terminal portion, a current collector, and a connecting portion which penetrates the case and connects the terminal portion and the current collector, and the energy storage device.

BACKGROUND ART

In an energy storage device, an electrode assembly is housed in a case, a connecting terminal which is an example of a terminal portion and is electrically connected to the electrode assembly is provided in an exposed manner from the case. For example, as described in patent document 1, a shaft portion of the connecting terminal penetrates a lid plate which forms a part of the case and is electrically connected to the electrode assembly. An insulator is interposed between the connecting terminal and the lid plate. By swaging the shaft portion of the terminal, the insulator is brought into close contact with the lid plate thus ensuring airtightness of the energy storage device.

PRIOR ART DOCUMENTS

Patent Documents

Patent Document 1: JP-A-2012-28246

SUMMARY OF THE INVENTION

Problems to be Solved by the Invention

As in the case of the above-mentioned conventional energy storage device, it is important for the energy storage device to ensure airtightness. Accordingly, in the energy storage device, there has been a demand for the enhancement of keeping of airtightness.

The present invention has been made in view of the above-mentioned circumstances, and it is an object of the present invention to provide a method for manufacturing an energy storage device which can enhance the keeping of airtightness and the energy storage device.

Means for Solving the Problems

To achieve the object, a method according to an aspect of the present invention for manufacturing an energy storage device which includes a case, a terminal portion, a current collector and a connecting portion which penetrates the case and connects the terminal portion and the current collector, includes: a swaging step in which a swaged portion is formed by swaging a tip portion, penetrating the terminal portion or the current collector and projecting in a predetermined direction from the terminal portion or the current collector, of the connecting portion, wherein, in the swaging step, the tip portion of the connecting portion is swaged by a punch which includes a pressing surface, the pressing surface including a first concave portion which is concaved in the predetermined direction and a second concave portion which is concaved in the predetermined direction more than the first concave portion at an inner peripheral side of the first concave portion.

Advantages of the Invention

According to the present invention, the keeping of airtightness of an energy storage device can be enhanced.

MODE FOR CARRYING OUT THE INVENTION

Figure 1:
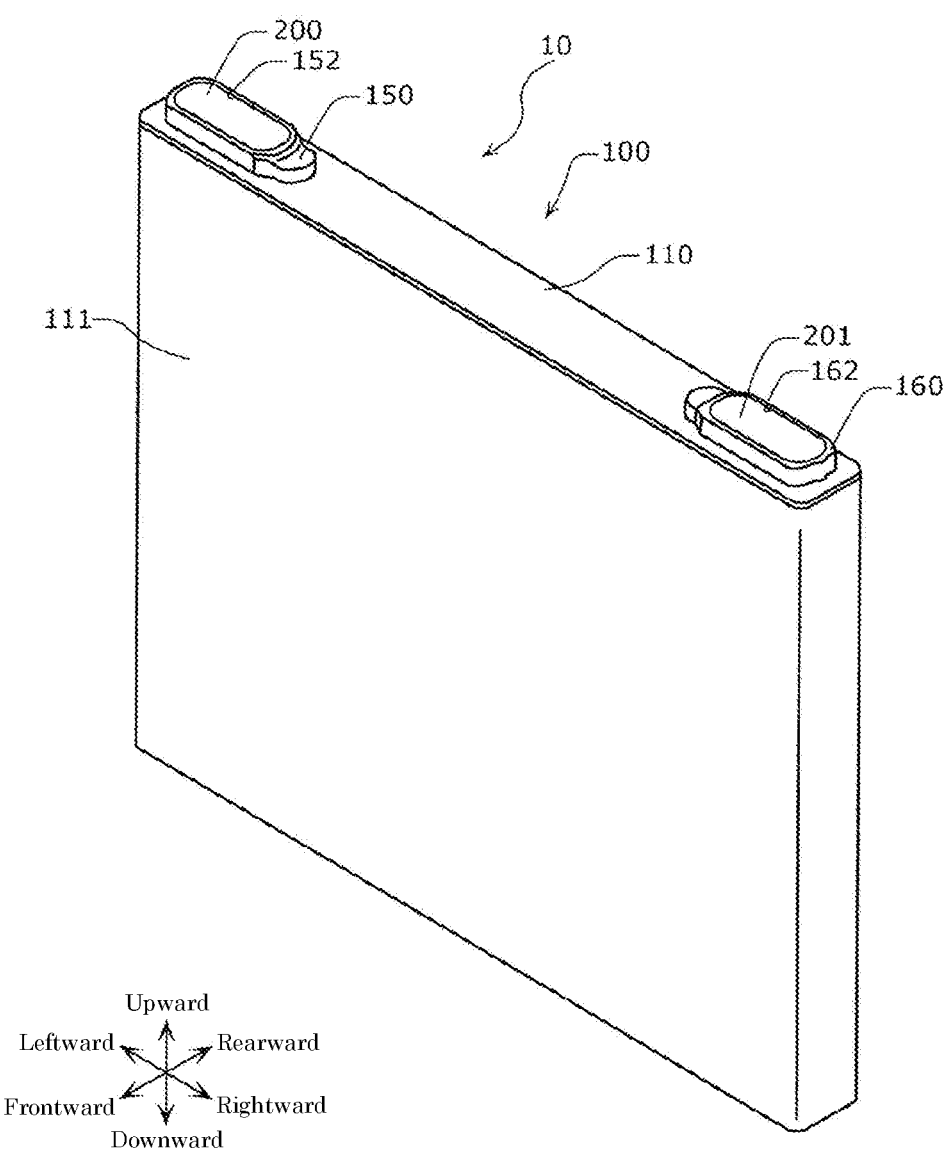
FIG. 1 is a perspective view schematically showing an external appearance of an energy storage device according to an embodiment.

As mentioned above, in energy storage devices, there has been a demand for the enhancement of keeping of airtightness. To achieve the object, a method according to an aspect of the present invention for manufacturing an energy storage device which includes a case, a terminal portion, a current collector and a connecting portion which penetrates the case and connects the terminal portion and the current collector, includes: a swaging step in which a swaged portion is formed by swaging a tip portion, penetrating the terminal portion or the current collector and projecting in a predetermined direction from the terminal portion or the current collector, of the connecting portion, wherein, in the swaging step, the tip portion of the connecting portion is swaged by a punch which includes a pressing surface, the pressing surface including a first concave portion which is concaved in the predetermined direction and a second concave portion which is concaved in the predetermined direction more than the first concave portion at an inner peripheral side of the first concave portion.

With such a manufacturing method, with the use of the punch which includes the first concave portion and the second concave portion which is concaved in the same predetermined direction as the first concave portion, a force which acts in the swaging step is generated in a direction toward the terminal portion or the current collector (a direction opposite to the predetermined direction). Accordingly, the swaged portion presses the terminal portion or the current collector in the direction (the direction opposite to the predetermined direction). That is, in the swaging step, the tip portion of the connecting portion is expanded toward the outside in a radial direction in the inside of the second concave portion and, thereafter, the tip portion moves away in a direction opposite to the direction in the inside of the first concave portion. Accordingly, it is possible to prevent a portion of the connecting portion which penetrates the terminal portion or the current collector from expanding toward the outside in a radial direction (a direction intersecting with the predetermined direction) so that it is possible to prevent the deformation of the terminal portion or the current collector in the direction intersecting with the predetermined direction. With such a method for manufacturing an energy storage device, it is possible to enhance the keeping of airtightness of the energy storage device.

In the swaging step, the tip portion of the connecting portion may be swaged by the punch which includes the pressing surface, the pressing surface including a convex portion in a central region of the second concave portion.

With such a manufacturing method, in swaging the connecting portion, it is possible to make the tip portion of the connecting portion expand toward the outside in a radial direction in the inside of the second concave portion and move the tip portion in the direction opposite to the predetermined direction in the inside of the first concave portion effectively by a convex portion of the punch. Accordingly, a force which acts in swaging the connecting portion minimally acts in a direction intersecting with the predetermined direction, and the force acts in a direction opposite to the predetermined direction. As a result, keeping of airtightness of the energy storage device can be enhanced.

In the swaging step, the tip portion of the connecting portion may be swaged by the punch which includes the pressing surface on which an annular flat surface portion is formed at a circumference of the second concave portion inside the first concave portion.

With such a manufacturing method, in swaging the tip portion of the connecting portion, the flat surface portion presses the connecting portion in a direction opposite to the predetermined direction and hence, a force acts in the direction opposite to the predetermined direction. As a result, keeping of airtightness of the energy storage device can be enhanced.

The energy storage device may further include a sealing portion to keep airtightness between the terminal portion and the current collector, and, in the swaging step, the sealing portion may be placed at a position corresponding to the flat surface portion of the first concave portion and then the tip portion of the connecting portion may be swaged.

With such a manufacturing method, in swaging the tip portion of the connecting portion, the current collector and the terminal portion press the sealing portion at the position corresponding to the flat surface portion of the first concave portion. As a result, airtightness can be ensured between the terminal portion, the current collector, and the case and hence, keeping of airtightness of the energy storage device can be enhanced.

An energy storage device according to an aspect of the present invention includes a case, a terminal portion, a current collector and a connecting portion which penetrates the case and connects the terminal portion and the current collector, wherein the connecting portion includes a swaged portion which penetrates the terminal portion or the current collector and projects in a predetermined direction from the terminal portion or the current collector, wherein the swaged portion includes: a first convex portion which protrudes in the predetermined direction; and a second convex portion which protrudes in the predetermined direction more than the first convex portion at an inner peripheral side of the first concave portion.

With such a configuration, keeping of airtightness of the energy storage device can be enhanced.

A concave portion may be formed in a center region of the second convex portion.

The concave portion may be formed at a side of the predetermined direction than the first convex portion.

With such a configuration, the concave portion is formed at a side of the predetermined direction than the first convex portion, that is, a side of the second convex portion and hence, in swaging, the connecting portion is minimally expanded (minimally increased in diameter) by pressing toward the outside in a radial direction. Accordingly, it is possible to suppress the occurrence of whitening or cracks in a gasket around the connecting portion.

In the first convex portion, an annular flat surface portion may be formed at a circumference of the second convex portion.

The energy storage device may further include an annular deformation portion to keep air tightness between the terminal portion and the current collector, wherein the annular deformation portion may be disposed at a position corresponding to the flat surface portion of the first convex portion.

Hereinafter, an energy storage device according to an embodiment of the present invention is described with reference to drawings. The embodiment described hereinafter is a preferred specific example of the present invention. In the embodiment described hereinafter, numerical values, shapes, materials, constitutional elements, the arrangement positions and connection states of the constitutional elements and the like are merely examples, and these are not intended to be used for limiting the present invention. Further, out of the constitutional elements in the embodiment described hereinafter, the constitutional elements which are not described in independent claims describing an uppermost concept are described as arbitrary constitutional elements.

The respective drawings are schematic drawings where constitutional elements are not always described strictly accurately. Further, in the respective drawings, constitutional elements substantially equal to each other are given the same symbols, and their repeated description is omitted or simplified.

Embodiment

[Configuration]

Hereinafter, an energy storage device 10 according to an embodiment of the present invention is described.

Figure 2:
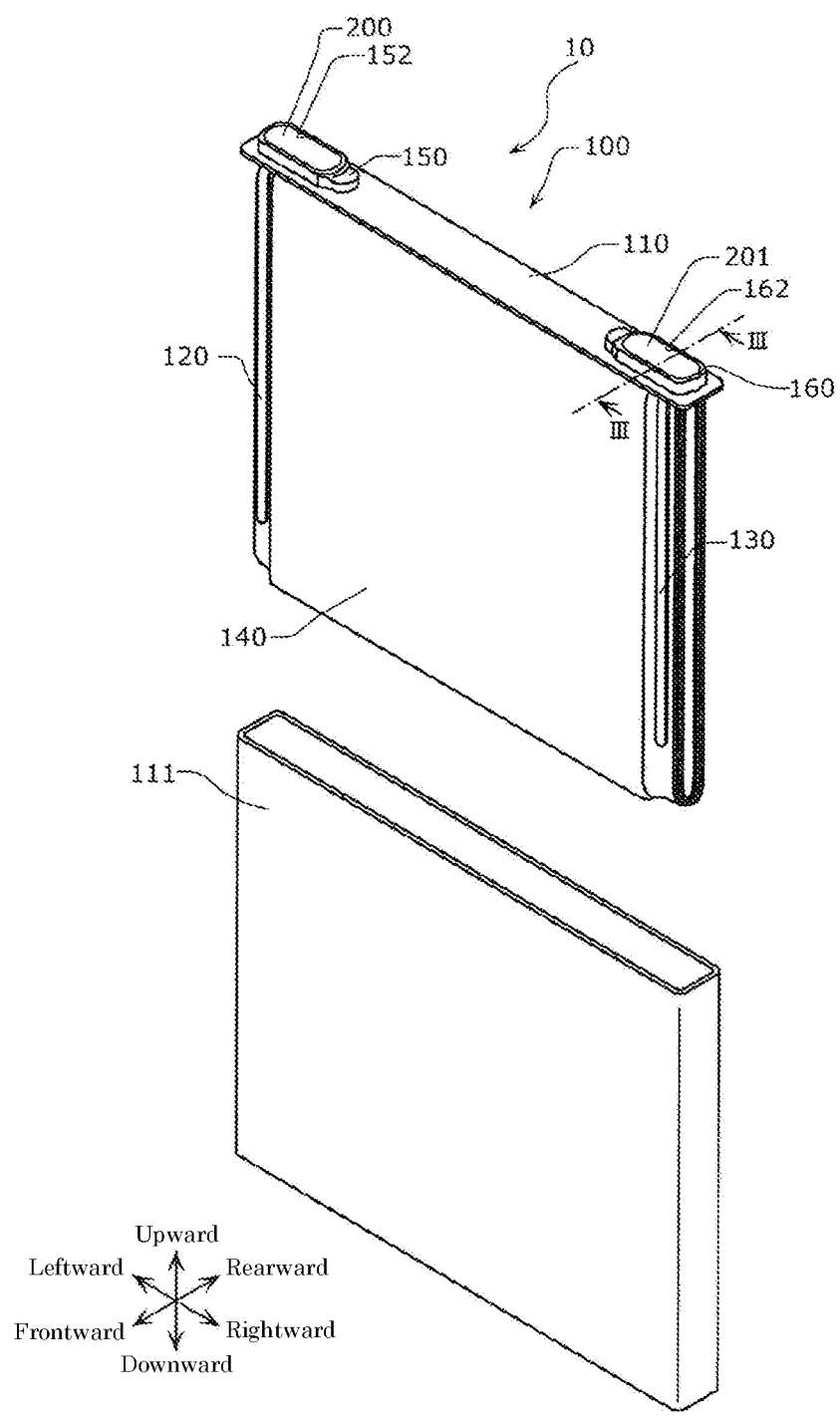
FIG. 2 is a perspective view showing respective constitutional elements which the energy storage device includes in a state where a case body of a case of the energy storage device according to the embodiment is separated.

FIG. 1 is a perspective view schematically showing an external appearance of the energy storage device 10 according to the embodiment. FIG. 2 is a perspective view showing respective constitutional elements which the energy storage device 10 includes in a state where a case body 111 of a case 100 of the energy storage device 10 according to the embodiment is separated.

In FIG. 1, in the energy storage device 10, respective directions, that is, frontward and rearward directions, leftward and rightward directions, and upward and downward directions are shown by defining a positive electrode terminal 201 side of the energy storage device 10 as a right side. All of the respective directions described in the drawings succeeding to FIG. 2 are shown corresponding to respective directions in FIG. 1. Actual upward and downward directions, leftward and rightward directions, and frontward and rearward directions of the energy storage device are changed depending on a mode of use and hence, the present invention is not limited to such a configuration.

The energy storage device 10 is a secondary battery which can charge electricity and can discharge electricity. To be more specific, the energy storage device 10 is a nonaqueous electrolyte secondary battery such as a lithium ion secondary battery. The energy storage device 10 is not limited to a nonaqueous electrolyte secondary battery, and may be a secondary battery other than a nonaqueous electrolyte secondary battery, or may be a capacitor and, further, the energy storage device 10 may be a primary battery where a user can use stored electricity without charging.

As shown in FIG. 1 and FIG. 2, the energy storage device 10 includes: a case 100; a positive electrode terminal 201 (one example of a terminal portion); a negative electrode terminal 200 (one example of the terminal portion); a positive electrode current collector 130 (one example of a current collector); a negative electrode current collector 120 (one example of the current collector); a positive electrode first sealing member 160; a negative electrode first sealing member 150; and an electrode assembly 140.

Although a liquid such as an electrolyte solution (nonaqueous electrolyte) is sealed in the case 100 of the energy storage device 10, the illustration of such a liquid is omitted. As the electrolyte solution sealed in the case 100, a kind of the electrolyte solution is not particularly limited, and various kinds of electrolyte solution can be selected provided that performance of the energy storage device 10 is not impaired.

The case 100 is formed of: the case body 111 which has a bottomed rectangular cylindrical shape; and a lid body 110 which is a plate-like member for closing an opening of the case body 111. The case 100 is configured such that the inside of the case 100 can be hermetically sealed by joining the lid body 110 and the case body 111 to each other by welding or the like after the positive electrode current collector 130, the negative electrode current collector 120, the electrode assembly 140 and the like are accommodated in the inside of the case 100. Materials for forming the lid body 110 and the case body 111 are not particularly limited, for example, it is preferable that the lid body 110 and the case body 111 be made of weldable metal such as stainless steel, aluminum, an aluminum alloy, iron or a plated steel sheet.

The electrode assembly 140 is an energy storage element (power generating element) which includes a positive electrode, a negative electrode and a separator, and can store electricity. The positive electrode is an electrode formed by forming a positive active material layer on a positive electrode substrate foil which is a metal foil having an elongated strip shape and made of aluminum, an aluminum alloy or the like. The negative electrode is an electrode formed by forming a negative active material layer on a negative electrode substrate foil which is a metal foil having an elongated strip shape and made of copper, a copper alloy, or the like. Further, the separator is a microporous sheet made of a resin.

As a positive active material for forming the positive active material layer and a negative active material for forming the negative active material layer, a known material can be suitably used provided that the material is a positive active material and a negative active material capable of occluding and discharging lithium ions.

As the positive active material, for example, a polyanion compound such as $LiMPO_4$, $LiMSiO_4$, $LiMBO_3$ (M indicating one kind or two or more kinds of transition metal elements selected from Fe, Ni, Mn, Co and the like), a spinel compound such as lithium titanate, lithium manganate, a lithium transition metal oxide such as $LiMO_2$ (M indicating one kind or two or more kinds of transition metal elements selected from Fe, Ni, Mn, Co and the like) and the like can be used.

As the negative active material, for example, in addition to lithium metal and a lithium alloy (an alloy containing lithium metal such as lithium-aluminum, lithium-silicon, lithium-lead, lithium-tin, lithium-aluminum-tin, lithium-gallium, and a Wood's alloy), an alloy which can occlude and discharge lithium, a carbon material (for example, graphite, hardly graphitizable carbon, easily graphitizable carbon, low temperature baked carbon, amorphous carbon or the like), a metal oxide, a lithium metal oxide ($Li_4Ti_5O_{12}$ or the like), a polyphosphoric acid compound or the like can be named.

The electrode assembly 140 is formed by winding a positive electrode, a negative electrode, and a separator which are arranged in a layered manner with the separator sandwiched between the positive electrode and the negative electrode, and is electrically connected to the positive electrode current collector 130, and the negative electrode current collector 120. In FIG. 2, the electrode assembly 140 having an elongated circular cross section is shown. However, the electrode assembly 140 may have a circular cross section or an elliptical cross section. Further, the electrode assembly 140 is not limited to a winding-type electrode assembly, and may be a stacking-type electrode assembly where flat-plate-like electrode plates are stacked to each other.

The positive electrode terminal 201 is an electrode terminal which is disposed outside the case 100, and is electrically connected to the positive electrode of the electrode assembly 140. The negative electrode terminal 200 is an electrode terminal which is disposed outside the case 100, and is electrically connected to the negative electrode of the electrode assembly 140. That is, the positive electrode terminal 201 and the negative electrode terminal 200 are conductive electrode terminals through which electricity stored in the electrode assembly 140 is discharged to a space outside the energy storage device 10, and through which electricity is introduced into a space inside the energy storage device 10 for storing the electricity in the electrode assembly 140. The positive electrode terminal 201 and the negative electrode terminal 200 are mounted on the lid body 110 by way of a positive electrode first sealing member 160 and a negative electrode first sealing member 150 respectively.

The positive electrode current collector 130 and the negative electrode current collector 120 are disposed inside the case 100, that is, on an inner surface (a lower surface) of the lid body 110. To be more specific, the positive electrode current collector 130 is a member having conductivity and rigidity which is disposed between the positive electrode of the electrode assembly 140 and a side wall of the case body 111, and is electrically connected to the positive electrode terminal 201 and the positive electrode of the electrode assembly 140. The negative electrode current collector 120 is a member having conductivity and rigidity which is disposed between the negative electrode of the electrode assembly 140 and a side wall of the case body 111, and is electrically connected to the negative electrode terminal 200 and the negative electrode of the electrode assembly 140.

The positive electrode current collector 130 is made of aluminum, an aluminum alloy or the like in the same manner as the positive electrode substrate foil of the electrode assembly 140. The negative electrode current collector 120 is made of copper, a copper alloy or the like in the same manner as the negative electrode substrate foil of the electrode assembly 140.

The positive electrode first sealing member 160 and the negative electrode first sealing member 150 are gaskets, where at least a portion of the positive electrode first sealing member 160 is disposed between the positive electrode terminal 201 and the lid body 110 and at least a portion of the negative electrode first sealing member 150 is disposed between the negative electrode terminal 200 and the lid body 110 respectively. To be more specific, the positive electrode first sealing member 160 has a concave portion 162 which opens upwardly, and the positive electrode terminal 201 is accommodated in the concave portion 162. Similarly, the negative electrode first sealing member 150 has a concave portion 152 which opens upwardly, and the negative electrode terminal 200 is accommodated in the concave portion 152. With such a configuration, the positive electrode terminal 201 and the negative electrode terminal 200 are mounted on the lid body 110 in a state where a portion of the positive electrode terminal 201 and a portion of the negative electrode terminal 200 are exposed to the outside.

Next, a fixing structure where the positive electrode terminal 201 is fixed to the lid body 110 together with the positive electrode current collector 130 by way of the positive electrode first sealing member 160 is described. The fixing structure is substantially equal to a fixing structure where the negative electrode terminal 200 is fixed to the lid body 110 together with the negative electrode current collector 120 by way of the negative electrode first sealing member 150 and hence, the description of the fixing structure on a negative electrode side is omitted.

Figure 3:
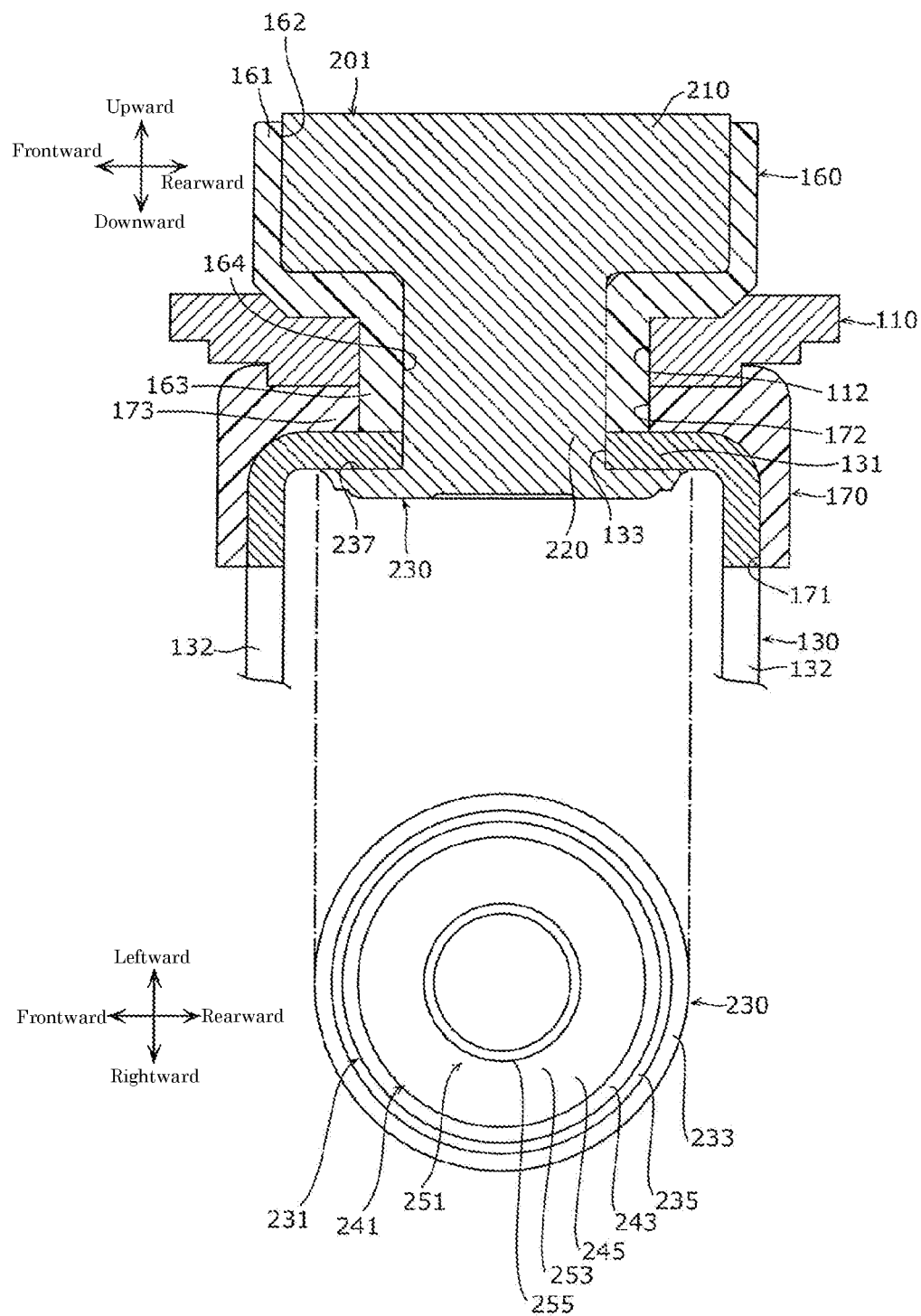
FIG. 3 is a partially enlarged cross-sectional view showing an energy storage device according to the embodiment, and is a front view of a swaged portion.

FIG. 3 is a partially-enlarged cross-sectional view showing the energy storage device 10 according to the embodiment, and is a front view of a swaged portion 230. An upper side of FIG. 3 is a cross-sectional view of the energy storage device 10 as viewed from a plane which is defined by a vertical direction and a longitudinal direction including line III-III in FIG. 2.

As shown in FIG. 3, the positive electrode terminal 201 is mounted on the lid body 110 in a state where the positive electrode terminal 201 is accommodated in the positive electrode first sealing member 160. The positive electrode current collector 130 is mounted on the positive electrode first sealing member 160 by way of a positive electrode second sealing member 170. In this manner, the positive electrode terminal 201, the positive electrode first sealing member 160, the lid body 110, the positive electrode current collector 130, and the positive electrode second sealing member 170 are integrally fixed to each other.

A through hole 112 is formed in the lid body 110, and a portion of the positive electrode first sealing member 160 in which the positive electrode terminal 201 is accommodated is inserted into the through hole 112.

The positive electrode second sealing member 170 is a gasket having at least a portion thereof disposed between the positive electrode current collector 130 and the lid body 110. It is preferable that the positive electrode second sealing member 170 be formed of a member having lower rigidity than the lid body 110 and having an insulating property. For example, the positive electrode second sealing member 170 is made of a resin such as polyphenylene sulfide (PPS), polypropylene (PP), polyethylene (PE), polybutylene terephthalate (PBT), polytetrafluoroethylene (PFA), polyether ether ketone (PEEK) or the like.

The positive electrode second sealing member 170 has a planar flat plate portion, and a pair of side walls which extends downward from both edges of the flat plate portion, and has a U shape as viewed in cross section. A concave portion 171 (accommodating portion) in which a current collector body portion 131 of the positive electrode current collector 130 is accommodated is formed in the positive electrode second sealing member 170. In a bottom portion 173 of the concave portion 171, a through hole 172 having the same shape as the through hole 112 formed in the lid body 110 is formed. The through hole 172 is disposed continuously with the through hole 112 of the lid body 110, and a portion of the positive electrode first sealing member 160 (a circular cylindrical portion 163 of the positive electrode first sealing member 160 described later) is inserted into the through holes 172, 112.

The positive electrode current collector 130 includes the current collector body portion 131, and electrode assembly connecting portions 132 as integral portions thereof. The current collector body portion 131 is a portion to which the positive electrode terminal 201 is connected. To be more specific, the current collector body portion 131 has a planar flat plate portion, and a pair of side walls which extends downward from both edges of the flat plate portion, and has a U shape as viewed in cross section. A through hole 133 through which a shaft portion 220 (one example of the connecting portion) of the positive electrode terminal 201 passes is formed in the current collector body portion 131.

The electrode assembly connecting portions 132 are two elongated legs which are electrically connected to the positive electrode of the electrode assembly 140. The electrode assembly connecting portions 132 are disposed below the through hole 133 formed in the current collector body portion 131. The electrode assembly connecting portions 132 of the positive electrode current collector 130 are connected to the positive electrode of the electrode assembly 140 by welding such as ultrasonic welding or resistance welding (see FIG. 2).

The positive electrode terminal 201 has a body portion 210, the shaft portion 220, and a swaged portion 230 as integral portions thereof on a positive electrode side. The body portion 210 is a portion which is connected with a bus bar or external equipment, and an upper surface of the body portion 210 is made flat.

The shaft portion 220 is a portion extending in a downward direction (one example of a predetermined direction) from a lower surface of the body portion 220. The shaft portion 220 passes through the lid body 110 and connects the positive electrode terminal 201 and the positive electrode current collector 130 to each other. The body portion 210 and the shaft portion 220 fix the positive electrode first sealing member 160, the positive electrode second sealing member 170, and the positive electrode current collector 130 to the lid body 110 by swaging a tip portion of the shaft portion 220 (the tip of the shaft portion 220 on a side opposite to the body portion 210). The swaged tip portion of the shaft portion 220 has a circular columnar shape, and a back surface of the swaged tip portion is brought into close contact with a bottom surface of the current collector body portion 131. That is, the swaged tip portion of the shaft portion 220 forms the swaged portion 230. The swaged portion 230 passes through the lid body 110, and projects downward from a flat plate portion (a bottom portion of a U-shaped concave portion) of the current collector body portion 131. The swaged portion 230 and the body portion 210 fasten the current collector body portion 131 of the positive electrode current collector 130, the circular cylindrical portion 163 of the positive electrode first sealing member 160, the positive electrode second sealing member 170, and the lid body 110 by sandwiching these constitutional elements in the vertical direction.

The positive electrode terminal 201 (the body portion 210, the shaft portion 220, and the swaged portion 230) is made of aluminum, an aluminum alloy or the like, for example. In the negative electrode terminal 200, for example, a body portion 210 is made of aluminum or an aluminum alloy, and the shaft portion 220 and the swaged portion 230 are made of copper, a copper alloy or the like.

The positive electrode first sealing member 160 has a terminal accommodating portion 161, and the circular cylindrical portion 163 as integral portions thereof.

In the terminal accommodating portion 161, the concave portion 162 in which the body portion 210 of the positive electrode terminal 201 is accommodated is formed.

The circular cylindrical portion 163 projects downward from a lower surface of the terminal accommodating portion 161 in a circular cylindrical manner, and opens upward and downward. A through hole 164 of the circular cylindrical portion 163 has a circular shape having the same diameter as the through hole 133 of the positive electrode current collector 130. The through hole 164 is disposed continuously with the through hole 133 of the positive electrode current collector 130, and the shaft portion 220 of the positive electrode terminal 201 is inserted into the through holes 164, 133. An outer diameter of the circular cylindrical portion 163 is set to a size which allows the insertion of the circular cylindrical portion 163 into the through holes 172, 112.

The positive electrode first sealing member 160 has a shape surrounding the shaft portion 220 of the positive electrode terminal 201 inserted into the through hole 164 of the circular cylindrical portion 163 about an axis of the circular cylindrical portion 163. It is preferable that the positive electrode first sealing member 160 be, as a whole, formed of a member having lower rigidity than the lid body 110 and having an insulating property. The positive electrode first sealing member 160 is made of a resin such as PPS, PP, PE, PBT, PFA, PEEK or the like, for example. The positive electrode first sealing member 160 may be formed by different material molding using plural kinds of resin materials. The positive electrode second sealing member 170 also may be formed by different material molding using plural kinds of resin materials.

Figure 4:
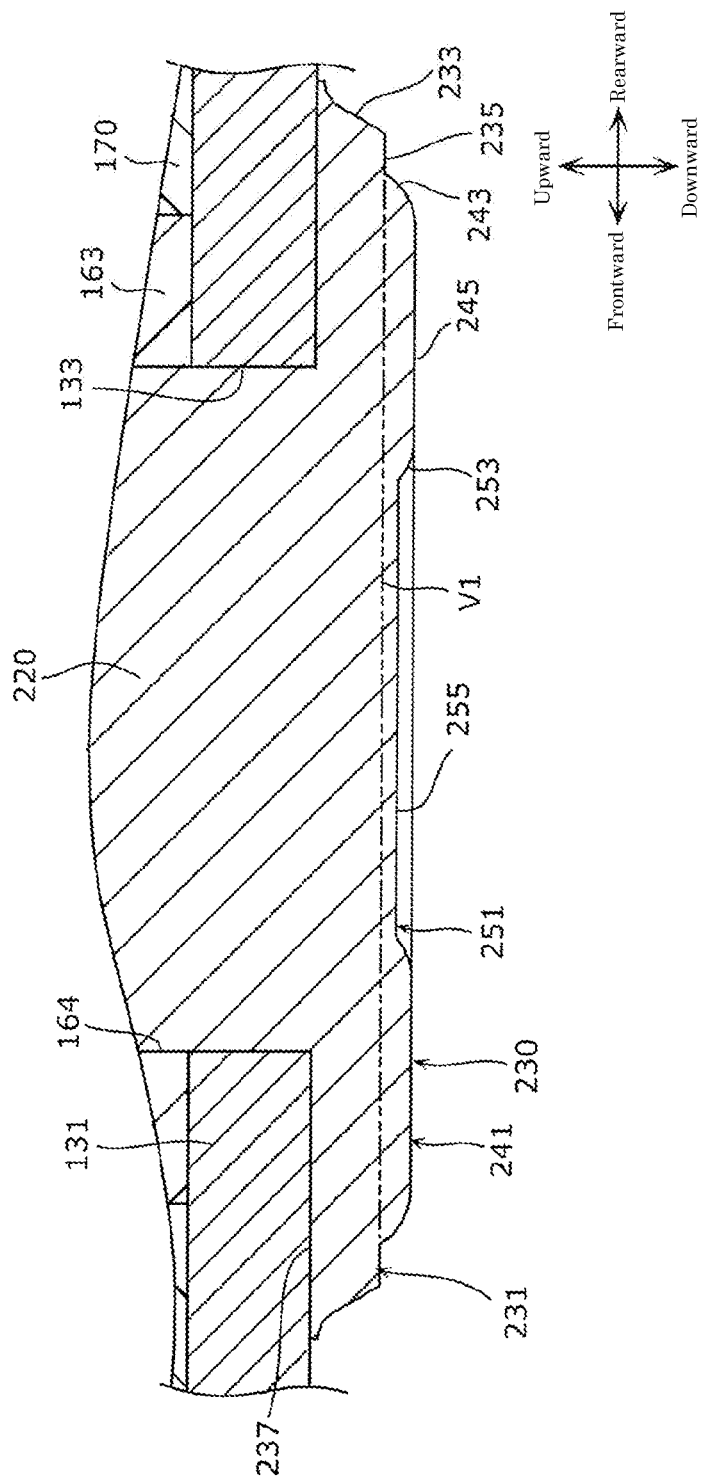
FIG. 4 is a partially enlarged cross-sectional view showing the swaged portion of the energy storage device according to the embodiment.

FIG. 4 is a partially-enlarged cross-sectional view showing the swaged portion 230 of the energy storage device 10 according to the embodiment.

As shown in FIG. 4, the swaged portion 230 has a disc shape and extends in a longitudinal direction as well as in a lateral direction on the flat plate portion of the current collector body portion 131. The positive electrode first sealing member 160 and the positive electrode second sealing member 170 are fastened to each other (the positive electrode first sealing member 160 and the positive electrode second sealing member 170 being held in a compressed state) between the swaged portion 230 and the body portion 210 of the positive electrode terminal 201. The swaged portion 230 is a portion formed by plastically straining a lower tip of the shaft portion 220.

The swaged portion 230 has a first convex portion 231 and a second convex portion 241.

The first convex portion 231 has a disc shape, and an upper surface of the first convex portion 231 has a contact surface 237 which is brought into contact with a lower surface of the bottom portion of the current collector body portion 131. In FIG. 4, an imaginary line V1 which connects a front inner peripheral edge and a rear inner peripheral edge of a first flat surface portion 235 (one example of a flat surface portion) is indicated by a double dashed chain line. The imaginary line V1 is a boundary between the first convex portion 231 and the second convex portion 241. The first convex portion is positioned above the imaginary line V1. The contact surface 237 is an annular surface which presses the positive electrode first sealing member 160 and the positive electrode second sealing member 170 by way of the bottom portion of the current collector body portion 131. The first convex portion 231 protrudes downward (one example of a predetermined direction) from the bottom portion of the current collector body portion 131. The first convex portion 231 has a first tapered surface 233 and the first flat surface portion 235.

The first tapered surface 233 forms an outer periphery of the first convex portion 231 where a diameter of the outer periphery is gradually decreased downward from the bottom portion of the current collector body portion 131. The first flat surface portion 235 forms a lower end surface of the first convex portion 231, and has an annular shape which surrounds the circumference of the second convex portion 241. The first flat surface portion 235 is formed from a lower end edge of the first tapered surface 233 to the second convex portion 241.

The second convex portion 241 has a disc shape having a diameter smaller than an outer diameter of the first convex portion 231 when the swaged portion 230 is viewed from below to above. The second convex portion 241 protrudes further downward from the first convex portion 231 on an inner peripheral side of the first convex portion 231. The second convex portion 241 is positioned below the imaginary line V1.

The second convex portion 241 has a second tapered surface 243, a second flat surface portion 245, and a first concave portion 251 (one example of a concave portion).

The second tapered surface 243 forms an outer periphery of the second convex portion 241 where a diameter of the outer periphery is gradually decreased downward from an inner peripheral side of the first flat surface portion 235. The second flat surface portion 245 forms a lower end surface of the second convex portion 241, and has an annular shape surrounding the circumference of the first concave portion 251. The second flat surface portion 245 is formed from a lower end edge of the second tapered surface 243 to the first concave portion 251.

The first concave portion 251 is formed at a center region of the second convex portion 241, and is concaved toward the shaft portion 220 from a lower end surface of the second convex portion 241. The first concave portion 251 has a circular shape when the swaged portion 230 is viewed from below to above. On the first concave portion 251, a third tapered surface 253 whose diameter is gradually decreased from an inner peripheral side of the second flat surface portion 245 toward the shaft portion 220 is formed. The third tapered surface 253 forms an inner peripheral surface of the first concave portion 251. A bottom portion of the first concave portion 251 is a flat surface which covers an upper end edge of the third tapered surface 253, and forms a third flat surface portion 255. The center region is a region where an axis of the second convex portion 241 and an axis of the shaft portion 220 agree with each other or are disposed adjacently to each other.

The first concave portion 251 is formed at a side of the above-mentioned predetermined direction (a downward direction side, that is, on a second convex portion 241 side) than the first convex portion 231. To be more specific, with respect to the first concave portion 251, a bottom surface of the first concave portion 251 is formed more on a second convex portion 241 side than the first flat surface portion 235 which is a distal end surface of the first convex portion 231 in the vertical direction. That is, the third flat surface portion 255 is formed on the second convex portion 241. In other words, a depth of the first concave portion 251 does not reach the first convex portion 231.

It is preferable that the respective axes of the first convex portion 231, the second convex portion 241, and the first concave portion 251 agree with the axis of the shaft portion 220. Further, the first concave portion 251 may be formed at a place away from the center region of the lower end surface (distal end surface) of the second convex portion 241. That is, the axis of the first concave portion 251 and the axis of the second convex portion 241 may not agree with each other.

[Manufacturing Method]

Next, a method for manufacturing the energy storage device 10 is described.

First, in the manufacture of the energy storage device 10, in swaging the tip portion of the shaft portion 220, a swaging machine not shown in the drawing is used. The swaging machine includes a circular columnar-shaped punch which is designed to be brought into contact with the shaft portion 220 of the positive electrode terminal 201. A tip portion of the punch forms a pressing surface which applies a pressing operation to the shaft portion 220 of the positive electrode terminal 201.

Figure 5:
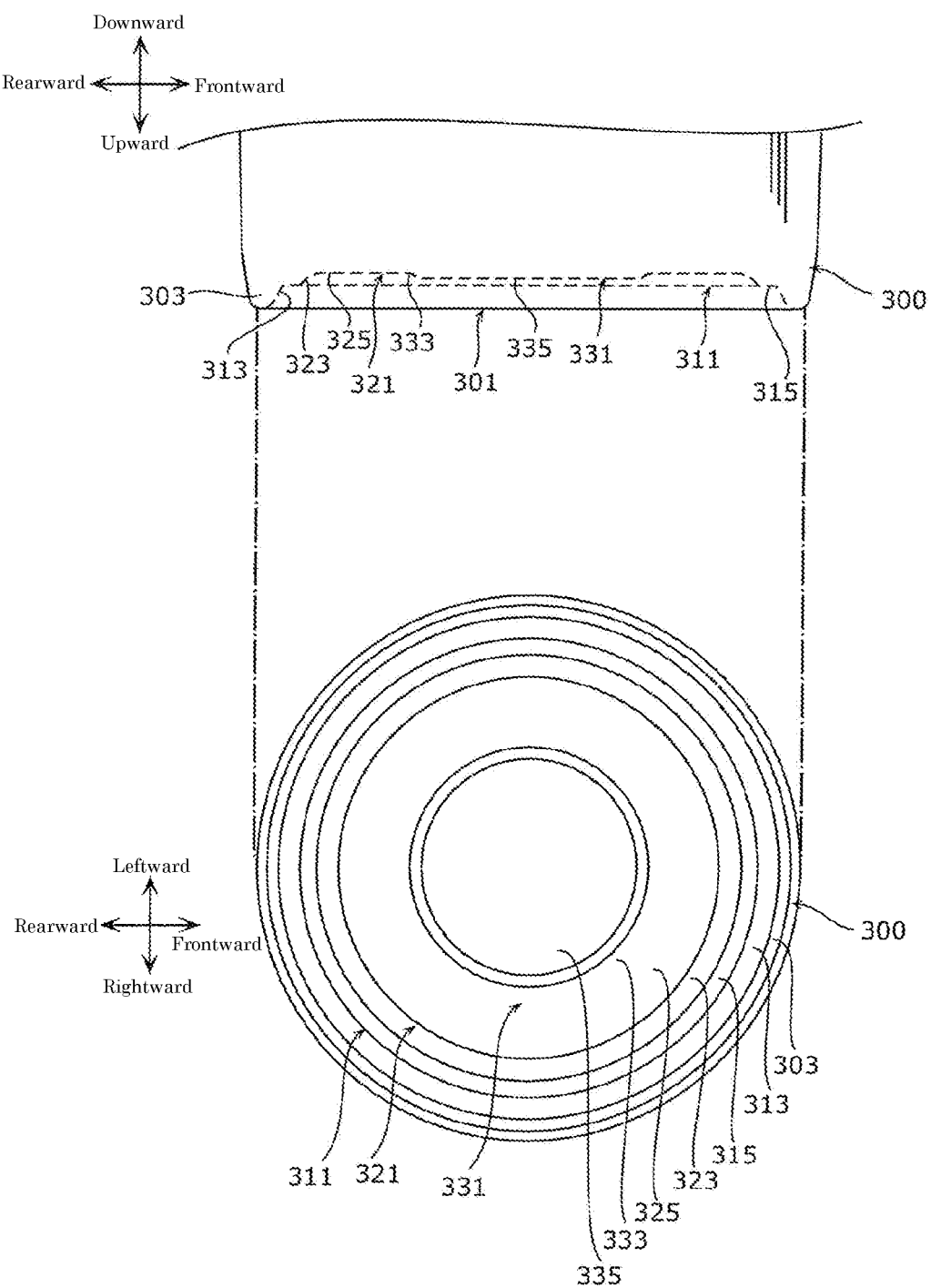
FIG. 5 is a partially enlarged view of a punch used for manufacturing the energy storage device according to the embodiment, and is a front view of a pressing surface of the punch.

FIG. 5 is a partially-enlarged view of a punch 300 used for the method for manufacturing the energy storage device 10 according to the embodiment, and is a front view of the pressing surface of the punch 300.

As shown in FIG. 5, a tip portion of the punch 300 includes a pressing surface 301 having a punch-side first concave portion 311 and a punch-side second concave portion 321, and a side wall 303.

The punch-side first concave portion 311 has a punch-side first tapered surface 313, and a punch-side first flat surface portion 315 (one example of a flat surface portion). The punch-side first concave portion 311 is concaved toward a side (downward direction) opposite to a pressing direction of the punch 300 (upward direction), and has a circular shape when the pressing surface 301 is viewed from above to below. The punch-side first tapered surface 313 is formed such that an inner diameter of the punch-side first tapered surface 313 is gradually decreased toward a side opposite to a pressing direction of the punch 300 from an upper end surface (distal end surface) of the side wall 303 to the punch-side first flat surface portion 315 (bottom portion) of the punch-side first concave portion 311. The punch-side first tapered surface 313 is an inner peripheral surface of the punch-side first concave portion 311. The punch-side first flat surface portion 315 is a bottom portion of the punch-side first concave portion 311, and has an annular shape surrounding the circumference of the punch-side second concave portion 321.

The punch-side second concave portion 321 has a punch-side second tapered surface 323, a punch-side second flat surface portion 325, and a punch-side first convex portion 331 (one example of a convex portion).

The punch-side second concave portion 321 is further concaved toward a side opposite to the pressing direction of the punch 300, and has a circular shape with a smaller diameter than the punch-side first concave portion 311 when the pressing surface 301 is viewed from above to below. The punch-side second tapered surface 323 is formed such that an inner diameter of the punch-side second tapered surface 323 is gradually decreased toward a side opposite to the pressing direction of the punch 300 from an inner peripheral side of the punch-side first flat surface portion 315 to the punch-side second flat surface portion 325. The punch-side second tapered surface 323 is an inner periphery of the punch-side second concave portion 321. The punch-side second flat surface portion 325 is a bottom portion of the punch-side second concave portion 321, and has an annular shape surrounding the circumference of the punch-side first convex portion 331.

The side wall 303 is an outer-peripheral-side wall which forms the punch-side first concave portion 311 and the punch-side second concave portion 321. The side wall 303 has an annular shape when the pressing surface 301 is viewed from above to below.

The punch-side first convex portion 331 is formed at a center region of a bottom portion of the punch-side second concave portion 321, and has a circular shape when the pressing surface 301 is viewed from above to below. It is preferable that an axis of the punch-side first convex portion 331 agree with the axis of the punch 300.

The punch-side first convex portion 331 has a punch-side third tapered surface 333 and a punch-side third flat surface portion 335.

The punch-side third tapered surface 333 is formed such that an outer diameter of the punch-side third tapered surface 333 is gradually decreased in a pressing direction of the punch 300 from an inner peripheral side of the punch-side second flat surface portion 325 to the punch-side third flat surface portion 335. The punch-side third flat surface portion 335 has a circular shape when the pressing surface 301 is viewed from above to below. A height of the punch-side first convex portion 331 is smaller than a depth of the punch-side second concave portion 321.

It is preferable that respective axes of punch-side first concave portion 311, punch-side second concave portion 321, and punch-side first convex portion 331 agree with the axis of the shaft portion 220. A height of the punch-side first convex portion 331 may be larger than a depth of the punch-side second concave portion 321, and may be smaller than a depth from an upper end surface of the side wall 303 to the punch-side second concave portion 321. A height of the punch-side first convex portion 331 is preferably set such that the punch-side first convex portion 331 does not project to the outside from the punch-side first concave portion 311.

Steps of manufacturing the energy storage device 10 are described. To be more specific, a swaging step S2 is described where the swaged portion 230 is formed by swaging the tip portion of the shaft portion 220 using the punch 300 having the pressing surface 301.

Figure 6:
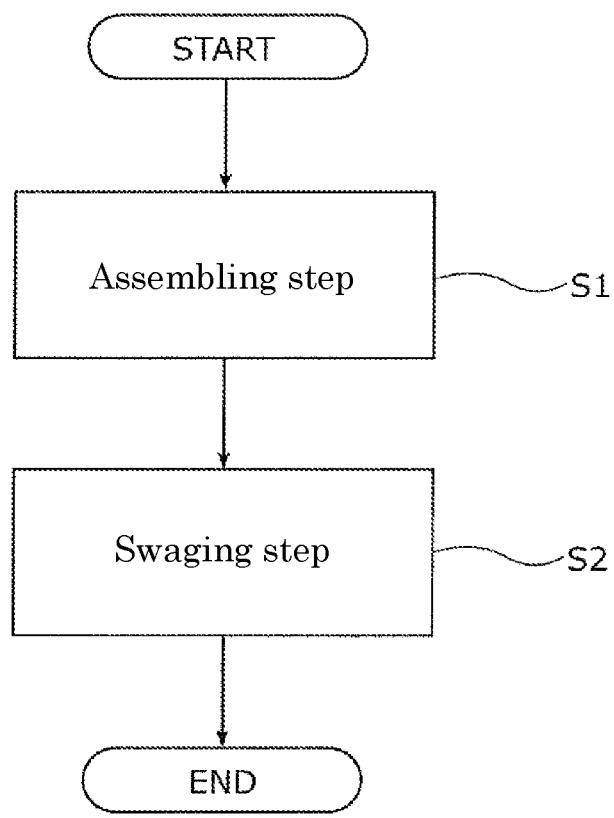
FIG. 6 is a flowchart showing a method for manufacturing the energy storage device according to the embodiment.
Figure 7:
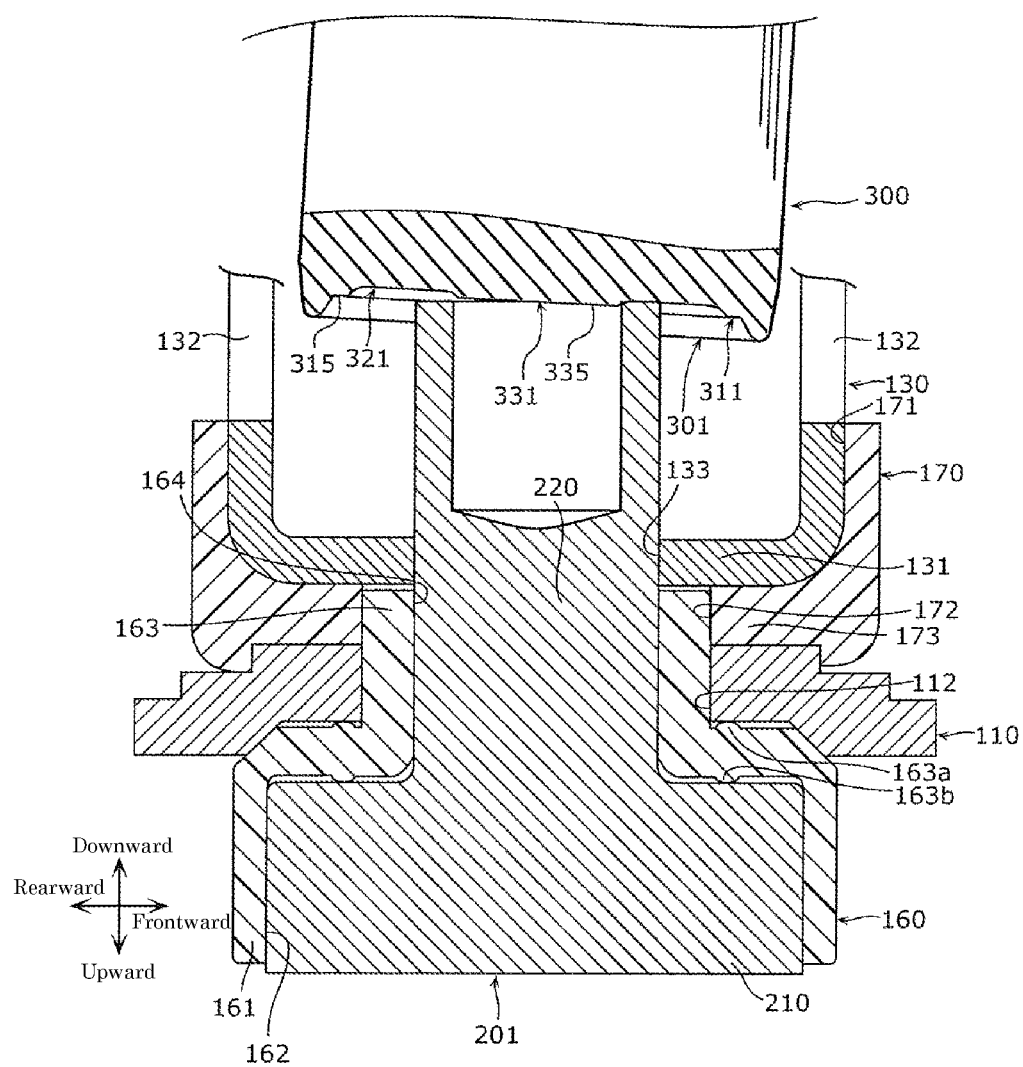
FIG. 7 is a partially enlarged cross-sectional view of the energy storage device showing a swaging step in the method for manufacturing the energy storage device according to the embodiment, and is a side view of the punch.
Figure 8:
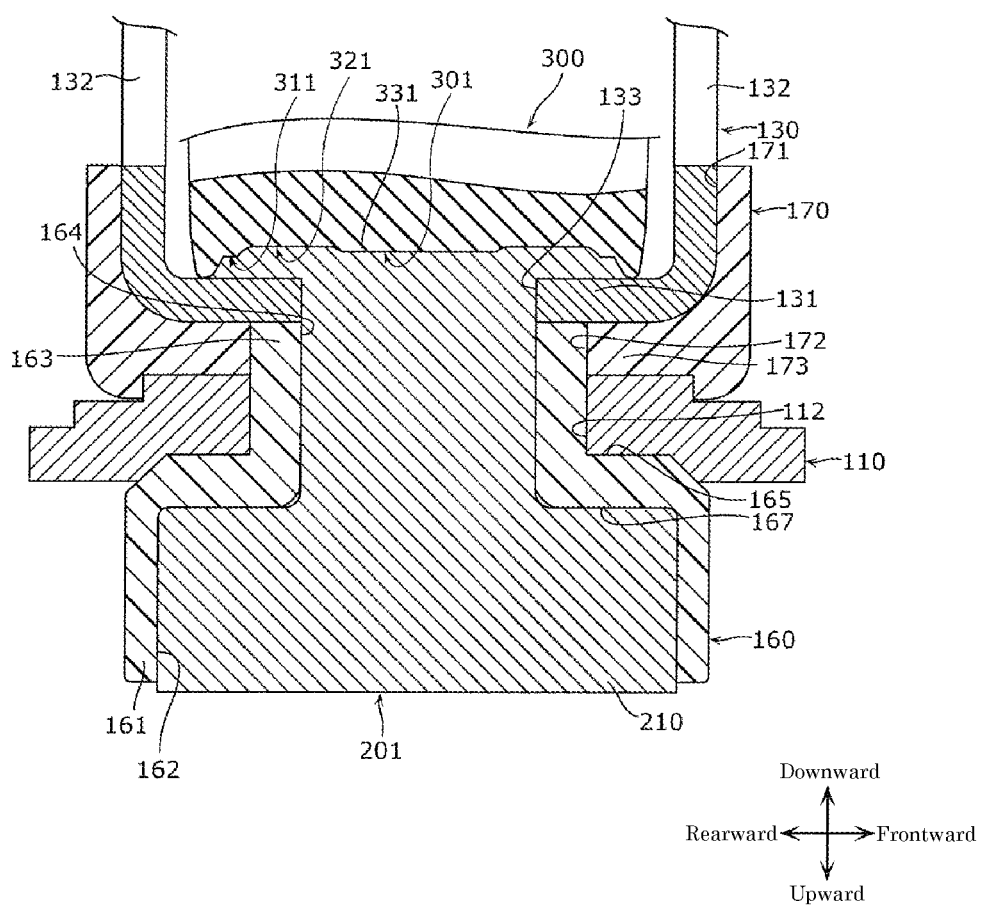
FIG. 8 is a partially enlarged cross-sectional view of the energy storage device showing a swaging step in the method for manufacturing the energy storage device according to the embodiment, and is a side view of the punch.

FIG. 6 is a flowchart showing a method for manufacturing the energy storage device 10 according to the embodiment. FIG. 7 is a partially-enlarged cross-sectional view of the energy storage device 10 and a side view of the punch 300 showing the swaging step S2 in the method for manufacturing the energy storage device 10 according to the embodiment. FIG. 7 shows a state before the lower end portion of the shaft portion 220 is swaged in the swaging step S2. FIG. 8 is a partially-enlarged cross-sectional view of the energy storage device 10 and a side view of the punch 300 showing the swaging step S2 in the method for manufacturing the energy storage device 10 according to the embodiment. FIG. 8 shows a state after the lower end portion of the shaft portion 220 is swaged by the punch 300 thus forming the swaged portion in the swaging step S2.

First, the lid body 110, the positive electrode first sealing member 160, the positive electrode second sealing member 170, the positive electrode current collector 130, and the positive electrode terminal 201 are disposed as shown in FIG. 7. The circular cylindrical portion 163 of the positive electrode first sealing member 160 is inserted into the through hole 112 of the lid body 110. Next, the shaft portion 220 of the positive electrode terminal 201 is inserted into the through hole 164 of the positive electrode first sealing member 160. Thereafter, the circular cylindrical portion 163 of the positive electrode first sealing member 160 is inserted into the through hole 172 of the positive electrode second sealing member 170, and the shaft portion 220 of the positive electrode terminal 201 is inserted into the through hole 133 of the positive electrode current collector 130. With such a configuration, a member shown in FIG. 7 is assembled (an assembling step in step S1 shown in FIG. 6).

A first annular convex portion 163a (one example of a sealing portion) and a second annular convex portion 163b (one example of the sealing portion) are formed on a lower surface and an upper surface of the bottom portion of the positive electrode first sealing member 160 respectively. The first annular convex portion 163a and the second annular convex portion 163b are disposed at positions corresponding to the first flat surface portion 235, and are integrally formed with the positive electrode first sealing member 160.

The first annular convex portion 163a is formed on a side where the bottom portion of the positive electrode first sealing member 160 and the lid body 110 are brought into contact with each other, and is a convex portion having a semicircular shape as viewed in cross section. It is preferable that the first annular convex portion 163a be formed annularly about an axis of the through hole 164.

The second annular convex portion 163b is a convex portion formed at a lower surface side of the body portion 210, and has a semicircular shape as viewed in cross section. It is preferable that the second annular convex portion 163b be formed into an annular shape about an axis of the through hole 164. The first annular convex portion 163a and the second annular convex portion 163b are disposed at positions corresponding to the punch-side first flat surface portion 315 in the vertical direction in a state where the energy storage device 10 is assembled.

In this embodiment, the first annular convex portion 163a and the second annular convex portion 163b are formed concentrically. However, the first annular convex portion 163a and the second annular convex portion 163b may not be formed concentrically. Further, a shape of the first annular convex portion 163a and a shape of the second annular convex portion 163b may not be a circular annular shape, and it is sufficient for the first annular convex portion 163a and the second annular convex portion 163b to have an annular shape. As other cross-sectional shapes of the first annular convex portion 163a and the second annular convex portion 163b, a polygonal shape such as a triangular shape or a quadrangular shape, an elliptical shape and the like can be named, for example. Further, at least only one of either the first annular convex portion 163a or the second annular convex portion 163b may be formed.

In a state before the shaft portion 220 is swaged in the swaging step S2 described later, a portion of the shaft portion 220 which projects from a flat surface portion of the current collector body portion 131 (a distal-end-side portion of the shaft portion 220) is formed as a hollow portion. However, the distal-end-side portion of the shaft portion 220 is not limited to a hollow portion, but may be formed as a solid portion.

Next, the assembled members are set in a swaging machine such that the position of the shaft portion 220 of the positive electrode terminal 201 and the position of the punch 300 correspond to each other. Spin-swaging is applied to the assembled members. To be more specific, by applying a pressing force to the assembled members using the punch 300 having the pressing surface 301 on which the punch-side first concave portion 311, the punch-side second concave portion 321, and the punch-side first convex portion 331 are formed, the tip portion of the shaft portion 220 is swaged. When the tip portion of the shaft portion 220 of the positive electrode terminal 201 is swaged, the tip portion of the shaft portion 220 is pressed so as to expand outward so that the tip portion of the shaft portion 220 is brought into close contact with the bottom portion of the current collector body portion 131 (a swaging step in step S2 shown in FIG. 6).

To be even more specific, first, the punch 300 is disposed in a state where the punch 300 is inclined with respect to the tip portion of the shaft portion 220 such that the tip portion of the shaft portion 220 is inserted into the punch-side second concave portion 321 of the punch 300. Then, the punch 300 is pressed in an upward direction shown in FIG. 7 while being rotated, and the tip portion of the shaft portion 220 is pressed. With such an operation, the tip portion of the shaft portion 220 is expanded outward in a radial direction in the inside of the punch-side second concave portion 321. In such an operation, the expansion of the tip portion of the shaft portion 220 toward the outside in a radial direction is finished in the inside of the punch-side second concave portion 321. Then, by further pressing the punch 300 in an upward direction, the tip portion of the shaft portion 220 moves away in an upward direction and is expanded in the inside of the punch-side first concave portion 311. Then, a moved-away portion in the inside of the punch-side first concave portion 311 is pressed in the upward direction by the punch-side first flat surface portion 315. In this manner, the expansion of the tip portion of the shaft portion 220 in the outward direction is finished in the inside of the punch-side second concave portion 321 and, thereafter, the tip portion of the shaft portion 220 is pressed upward in the inside of the punch-side first concave portion 311.

As shown in FIG. 8, the swaged portion 230 is formed into an inverted shape with respect to the pressing surface 301 of the punch 300. The flow shown in FIG. 6 is finished with this step.

[Manner of Operation and Advantageous Effects]

Next, the manner of operation and the advantageous effects of the method for manufacturing the energy storage device 10 and the energy storage device 10 according to this embodiment are described.

As described above, the energy storage device 10 includes: the case 100; the positive electrode terminal 201 and the negative electrode terminal 200; the positive electrode current collector 130 and the negative electrode current collector 120; and the shaft portions 220 which penetrate the case 100 and connect the positive electrode terminal 201 and the negative electrode terminal 200 and the positive electrode current collector 130 and the negative electrode current collector 120 to each other respectively. The method for manufacturing the energy storage device 10 includes the swaging step S2 in which the swaged portion 230 is formed by swaging the tip portion of the shaft portion 220 which penetrates the positive electrode terminal 201 and the positive electrode current collector 130 and projects in a downward direction from the positive electrode terminal 201 and the positive electrode current collector 130. In the swaging step S2, the tip portion of the shaft portion 220 is swaged by the punch 300 which includes the pressing surface 301 having the punch-side first concave portion 311 which is concaved in a direction (downward direction) opposite to the pressing direction (upward direction in FIG. 7), and the punch-side second concave portion 321 which is concaved in the downward direction more than the punch-side first concave portion 311 at an inner peripheral side of the punch-side first concave portion 311.

With such a manufacturing method, with the use of the punch 300 which includes the punch-side first concave portion 311 and the punch-side second concave portion 321 which is concaved in the same downward direction as the punch-side first concave portion 311 of the punch 300, a force which acts in the swaging step S2 is generated in an upward direction so that the swaged portion 230 is pressed in an upward direction. That is, in the swaging step S2, when the tip portion of the shaft portion 220 is brought into contact with the punch-side second concave portion 321 of the punch 300 so that the punch 300 is pressed in the upward direction, the tip portion is expanded toward the outside in a radial direction in the inside of the punch-side second concave portion 321. Thereafter, the tip portion moves away in a direction opposite to the downward direction in the inside of the punch-side first concave portion 311. With such an operation, it is possible to prevent the portion of the shaft portion 220 which penetrates the positive electrode current collector 130 from expanding toward the outside in a radial direction (in a direction intersecting with the vertical direction). Accordingly, it is possible to prevent the positive electrode current collector 130 from being deformed in a direction intersecting with the vertical direction. With such a method for manufacturing the energy storage device 10, it is possible to enhance the keeping of airtightness of the energy storage device 10.

Particularly, in this method for manufacturing the energy storage device 10, a force which acts in swaging the shaft portion 220 minimally acts in a direction intersecting with the upward direction (pressing direction). Accordingly, a phenomenon minimally occurs that an excessive force acts on the positive electrode second sealing member 170 by way of the current collector body portion 131 so that the positive electrode second sealing member 170 is deformed or damaged.

A force which acts in swaging the shaft portion 220 using the punch 300 in the swaging step S2 is described.

Figure 9:
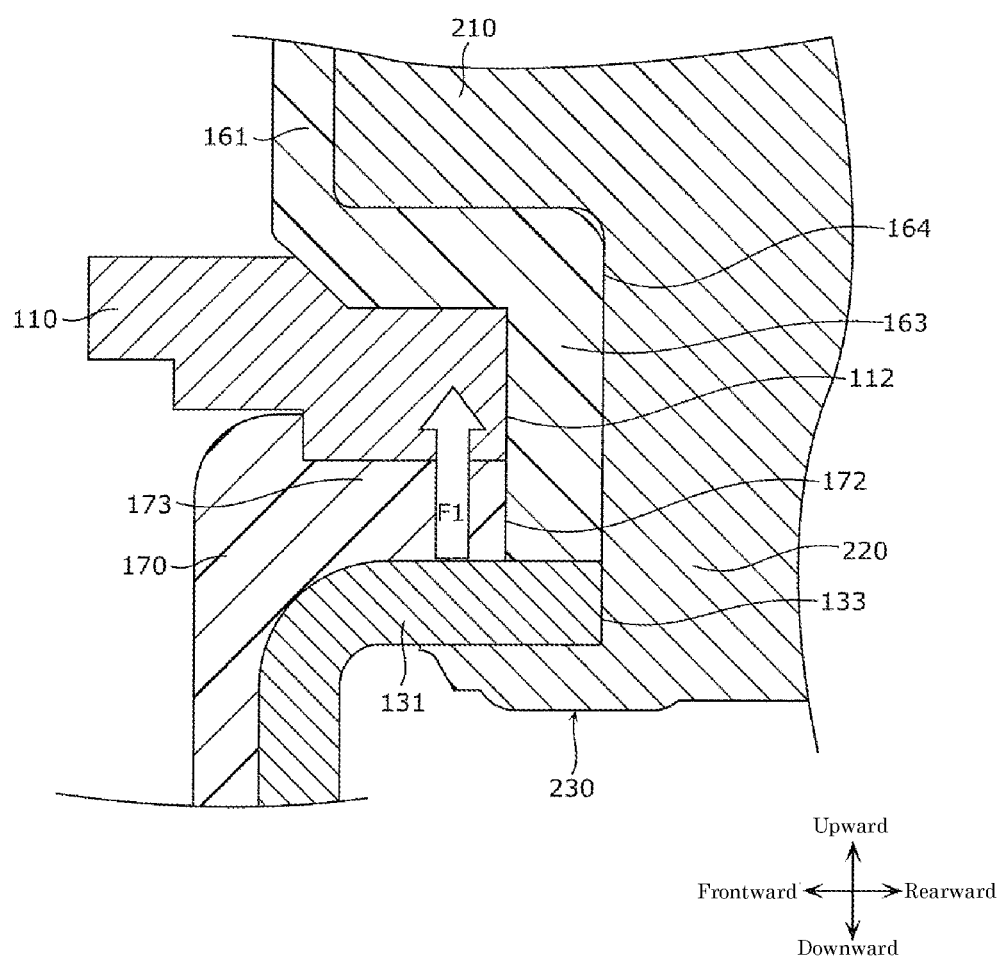
FIG. 9 is a partially enlarged cross-sectional view showing a swaged portion of the energy storage device according to the embodiment.

FIG. 9 is a partially-enlarged cross-sectional view showing the swaged portion 230 of the energy storage device 10 according to the embodiment.

As shown in FIG. 9, in swaging the shaft portion 220 in the swaging step S2, a back surface of the swaged portion 230 presses the circular cylindrical portion 163 of the positive electrode first sealing member 160 and the bottom portion 173 of the positive electrode second sealing member 170 by way of the current collector body portion 131 with a predetermined pressing force F1.

That is, as described above, in the swaging step S2, after the tip portion of the shaft portion 220 is expanded toward the outside in a radial direction in the inside of the punch-side second concave portion 321 of the punch 300, the tip portion moves away in an upward direction in the inside of the punch-side first concave portion 311. With such an operation, it is possible to prevent a portion of the shaft portion 220 which penetrates the positive electrode current collector 130 from expanding toward the outside in a radial direction thus suppressing the deformation of the positive electrode current collector 130 toward the outside in a radial direction.

In this manner, the swaged portion 230 of the shaft portion 220 and the body portion 210 fasten the current collector body portion 131 of the positive electrode current collector 130, the positive electrode first sealing member 160, the positive electrode second sealing member 170, and the lid body 110 by sandwiching these constitutional elements therebetween. Accordingly, with the use of the method for manufacturing the energy storage device 10, the keeping of airtightness of the energy storage device 10 can be enhanced.

In the method for manufacturing the energy storage device 10 according to the embodiment, in the swaging step S2, the tip portion of the shaft portion 220 is swaged by the punch 300 which includes the pressing surface 301 having the punch-side first convex portion 331 in a center region of the punch-side second concave portion 321.

According to the method for manufacturing the energy storage device 10, in swaging the shaft portion 220, it is possible to make the tip portion of the shaft portion 220 expand toward the outside in a radial direction in the punch-side second concave portion 321, and move the tip portion in the upward direction in the punch-side first concave portion 311 effectively by the punch-side first convex portion 331 of the punch 300. Accordingly, in swaging the connecting shaft portion 220, a force acts in the pressing direction of the punch 300 (a direction opposite to the predetermined direction). As a result, the swaged portion 230 can enhance the keeping of airtightness of the energy storage device 10.

In the method for manufacturing the energy storage device 10 according to the embodiment, in the swaging step S2, the tip portion of the shaft portion 220 is swaged by the punch 300 which includes the pressing surface 301 on which the annular punch-side first flat surface portion 315 is formed at the circumference of the punch-side second concave portion 321 inside the punch-side first concave portion 311.

According to the method for manufacturing the energy storage device 10, in swaging the tip portion of the shaft portion 220, a force acts in the vertical direction. Accordingly, the keeping of airtightness of the energy storage device 10 can be enhanced.

In the assembling step S1 according to the embodiment, in the energy storage device 10, the first annular convex portion 163a and the second annular convex portion 163b for keeping the airtightness between the positive electrode terminal 201 and the positive electrode current collector 130 are further formed. In the swaging step S2, the tip portion of the shaft portion 220 is swaged in a state where the first annular convex portion 163a and the second annular convex portion 163b are placed at positions corresponding to the punch-side first flat surface portion 315 of the punch-side first concave portion 311.

According to this method for manufacturing the energy storage device 10, in swaging the tip portion of the shaft portion 220, the lower surface of the body portion 210 and the upper surface of the lid body 110 press the first annular convex portion 163a and the second annular convex portion 163b of the positive electrode first sealing member 160 respectively at positions corresponding to the first flat surface portion 235 of the first convex portion 231 of the swaged portion 230. As a result, a pressing force acts in the upward direction, and the first annular convex portion 163a and the second annular convex portion 163b are efficiently collapsed. After the swaging is finished, the collapsed first annular convex portion 163a and the collapsed second annular convex portion 163b become a first annular deformation portion (one example of an annular deformation portion) 165 and a second annular deformation portion (one example of an annular deformation portion) 167 shown in FIG. 8 respectively. That is, the annular deformation portions are portions formed by deforming the first annular convex portion 163a and the second annular convex portion 163b respectively. With such a configuration, sealing property is further enhanced, and the keeping of airtightness of the energy storage device 10 can be enhanced.

As described above, the energy storage device 10 according to the embodiment includes the case 100, the positive electrode terminal 201, the positive electrode current collector 130, and the shaft portion 220 which penetrates the case 100 and connects the positive electrode terminal 201 and the positive electrode current collector 130 to each other. The shaft portion 220 includes the swaged portion 230 which penetrates the positive electrode terminal 201 and the positive electrode current collector 130 and projects in the downward direction from the positive electrode terminal 201 and the positive electrode current collector 130. Further, the swaged portion 230 has: the first convex portion 231 projecting downward; and the second convex portion 241 protruding downward more than the first convex portion 231 at an inner peripheral side of the first convex portion 231.

With such a configuration, as descried above, the positive electrode first sealing member 160 and the positive electrode second sealing member 170 are fastened to each other in the vertical direction between the swaged portion 230 and the body portion 210 of the positive electrode terminal 201 and hence, the keeping of airtightness of the energy storage device 10 can be enhanced.

In the energy storage device 10 according to the embodiment, the first concave portion 251 is formed at the center region of the second convex portion 241. As shown in FIG. 4, the first concave portion 251 is formed more at a side of the downward direction (a side of the predetermined direction) than the first convex portion 231.

When the first concave portion 251 is formed more at a side of the upward direction than the first convex portion 231 as in the case of an eyelet (for example, see patent document 2: JP-A-2016-91660), in swaging the shaft portion 220, the shaft portion 220 is expanded by pressing toward the outside in a radial direction so that a diameter of the shaft portion 220 is liable to be increased. Further, when the shaft portion 220 is expanded by pressing toward the outside in a radial direction, the shaft portion 220 presses the inner peripheral surface of the through hole 164 of the circular cylindrical portion 163 so as to expand the circular cylindrical portion 163 of the positive electrode first sealing member 160. With such an expansion, there may be a possibility that whitening or cracks occur in the positive electrode first sealing member 160.

On the other hand, the first concave portion 251 is formed more on a side of the downward direction than the first convex portion 231 and hence, in swaging the shaft portion 220, the shaft portion 220 is not expanded by pressing toward the outside in a radial direction (is not increased in diameter) and hence, the tip portion of the shaft portion 220 can be expanded toward the outside in the radial direction. Since the shaft portion 220 is not increased in diameter, the outer peripheral surface of the shaft portion 220 does not press the inner peripheral surface of the through hole 164 of the circular cylindrical portion 163 of the positive electrode first sealing member 160, and is kept in a state approximately parallel to the inner peripheral surface. Accordingly, the occurrence of whitening or cracks on the positive electrode first sealing member 160 can be prevented. Since the shaft portion 220 is not increased in diameter, the outer peripheral surface of the shaft portion 220 and the inner peripheral surface of the through hole 164 of the circular cylindrical portion 163 are not brought into close contact with each other. Accordingly, a slight gap may be formed between the outer peripheral surface of the shaft portion 220 and the inner peripheral surface of the through hole 164 of the circular cylindrical portion 163.

In the energy storage device 10 according to the embodiment, at the first convex portion 231, the annular first flat surface portion 235 is formed at the circumference of the second convex portion 241.

The energy storage device 10 according to the embodiment further includes the first annular deformation portion 165 and the second annular deformation portion 167 to keep air tightness between the positive electrode terminal 201 and the positive electrode current collector 130. Further, the first annular deformation portion 165 and the second annular deformation portion 167 are disposed at positions corresponding to the first flat surface portion 235 of the first convex portion 231.

With such a configuration, as described above, in swaging the tip portion of the shaft portion 220, the lower surface of the body portion 210 and the upper surface of the lid body 110 press the first annular convex portion 163a of the positive electrode first sealing member 160 and the second annular convex portion 163b of the positive electrode first sealing member 160 at positions corresponding to the first flat surface portion 235 of the first convex portion 231. Accordingly, the first annular convex portion 163a and the second annular convex portion 163b are efficiently collapsed at positions corresponding to the first flat surface portion 235 of the first convex portion 231 of the swaged portion 230 and hence, the keeping of airtightness of an energy storage device 10 can be enhanced.

Since the first convex portion 231 and the second convex portion 241 are formed on the swaged portion 230, in performing an image inspection of the swaged portion 230, it is possible to easily inspect the presence or non-presence of a defect such as the displacement of an axis of the swaged portion 230 by detecting shades of these convex portions or the like.

Modification 1 of Embodiment

Hereinafter, the configuration of an energy storage device 10 according to a modification 1 of the embodiment is described with reference to FIG. 10.

In the modification 1 of the embodiment, other configurations of the energy storage device 10 are substantially equal to the corresponding configurations of the energy storage device 10 according to the embodiment and hence, identical constitutional elements are given the same symbols, and their detailed description is omitted.

Figure 10:
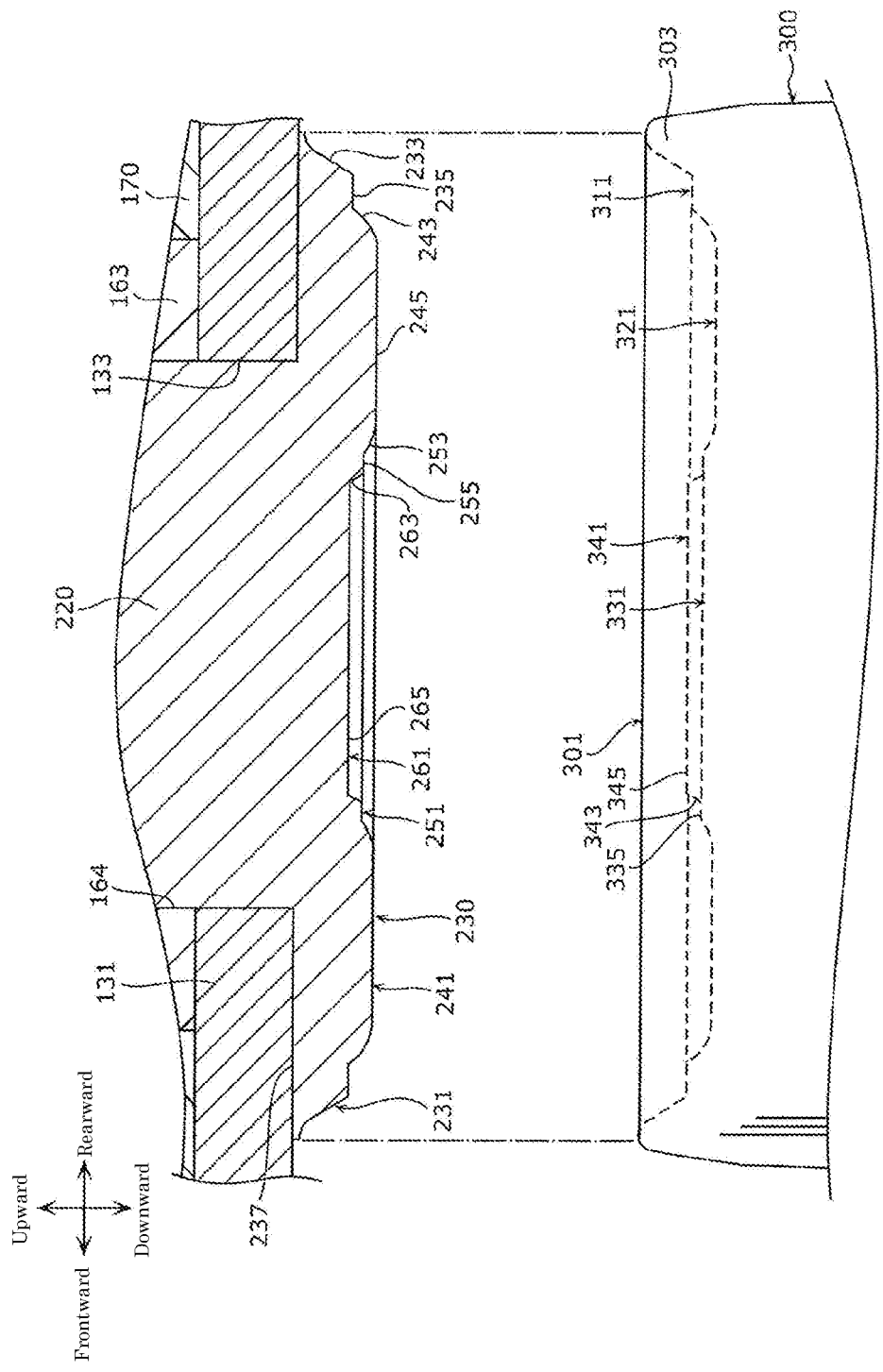
FIG. 10 is a partially enlarged cross-sectional view showing a swaged portion of an energy storage device according to a modification 1 of the embodiment.

FIG. 10 is a partially-enlarged cross-sectional view showing a swaged portion 230 of the energy storage device 10 according to the modification 1 of the embodiment.

As shown in FIG. 10, the swaged portion 230 further includes a second concave portion 261 (one example of a concave portion) in addition to a first convex portion 231, a second convex portion 241, and a first concave portion 251.

The second concave portion 261 is concaved toward a shaft portion 220 at a third flat surface portion 255 (bottom portion) of the first concave portion 251. The second concave portion 261 is formed at a center region of the third flat surface portion 255 of the first concave portion 251. The second concave portion 261 has a fourth tapered surface 263 and a fourth flat surface portion 265. The first concave portion 251 and the second concave portion 261 are formed only on the second convex portion 241. That is, the second concave portion 261 is formed more on a side of the above-mentioned predetermined direction than the first convex portion 231 (a side of the downward direction, that is, a second convex portion 241 side). To be more specific, a bottom surface of the second concave portion 261 is formed on a second convex portion 241 side than the first flat surface portion 235 which is a distal end surface of the first convex portion 231 in the vertical direction. That is, the fourth flat surface portion 265 is formed more on the second convex portion 241. In other words, a depth of the second concave portion 261 does not reach the first convex portion 231.

The fourth tapered surface 263 has a diameter smaller than an inner diameter of the first concave portion 251 when the swaged portion 230 is viewed from below to above. The fourth tapered surface 263 is formed such that an inner diameter of the fourth tapered surface 263 is gradually decreased toward the shaft portion 220 from an inner peripheral side of the third flat surface portion 255 of the first concave portion 251 to the fourth flat surface portion 265. The fourth flat surface portion 265 forms a bottom portion of the second concave portion 261.

In the method for manufacturing the energy storage device 10, on a punch-side second concave portion 321 of a pressing surface 301 of a punch 300 of a swaging machine, a punch-side second convex portion 341 is formed in addition to a punch-side first convex portion 331.

A punch-side third flat surface portion 335 of the punch-side first convex portion 331 is an annular flat surface when the pressing surface 301 is viewed from above to below. It is preferable that the punch-side third flat surface portion 335 be formed concentrically with a punch-side first flat surface portion 315.

The punch-side second convex portion 341 is positioned at an inner peripheral side of the punch-side third flat surface portion 335, and is formed at a center region of the punch-side third flat surface portion 335 of the punch-side first convex portion 331. The punch-side second convex portion 341 has a disc shape having a diameter smaller than the punch-side first convex portion 331 when the pressing surface 301 is viewed from above to below. The punch-side second convex portion 341 has a punch-side fourth tapered surface 343, and a punch-side fourth flat surface portion 345.

The punch-side fourth tapered surface 343 is formed such that an outer diameter of the punch-side fourth tapered surface 343 is gradually decreased in a pressing direction of the punch 300 from an inner peripheral side of the punch-side third flat surface portion 335 to the punch-side fourth flat surface portion 345. The punch-side fourth flat surface portion 345 has a circular shape when the pressing surface 301 is viewed from above to below. A height of the punch-side first convex portion 331 and a height of the punch-side second convex portion 341 of the punch 300 may be set larger than a depth from the pressing surface 301 to the punch-side second concave portion 321 or smaller than such a depth. It is preferable that a total height which is a sum of the height of the punch-side first convex portion 331 and the height of the punch-side second convex portion 341 of the punch 300 do not project outward from the first concave portion 251.

Also in the modification 1 of the embodiment, with the use of the punch 300, when the tip portion of the shaft portion 220 of the positive electrode terminal 201 is swaged from a state shown in FIG. 7, the swaged portion 230 and the body portion 210 fasten the current collector body portion 131 of the positive electrode current collector 130, the positive electrode first sealing member 160, the positive electrode second sealing member 170 and the lid body 110 to each other by sandwiching these constitutional elements therebetween in the vertical direction. Accordingly, the first annular convex portion 163a and the second annular convex portion 163b of the positive electrode first sealing member 160 are collapsed by compression so that a distance between the lid body 110 and the current collector body portion 131 is narrowed. In this manner, the swaged portion 230 is formed in an inverted shape with respect to the pressing surface 301 of the punch 300.

[Manner of Operation and Advantageous Effects]

Next, the method for manufacturing the energy storage device 10 according to the modification 1 of the embodiment and advantageous effects of the energy storage device 10 are described.

The modification 1 of the embodiment also can acquire substantially the same advantageous effects as the above-mentioned embodiment, and the keeping of airtightness between the positive electrode terminal 201 and the positive electrode current collector 130 and the case 100 can be enhanced. The second concave portion 261 is formed more on a side of the downward direction than the first convex portion 231 and hence, similar to the above-mentioned embodiment, in swaging the shaft portion 220, the shaft portion 220 is not expanded by pressing toward the outside in a radial direction (is not increased in diameter) and hence, the occurrence of whitening or cracks on the positive electrode first sealing member 160 can be prevented.

Modification 2 of Embodiment

Hereinafter, the configuration of an energy storage device 10 according to a modification 2 of the embodiment is described with reference to FIG. 11.

In the modification 2 of the embodiment, other configurations of the energy storage device 10 are substantially equal to the corresponding configurations of the energy storage device 10 according to the embodiment and hence, identical constitutional elements are given the same symbols, and their detailed description is omitted.

Figure 11:
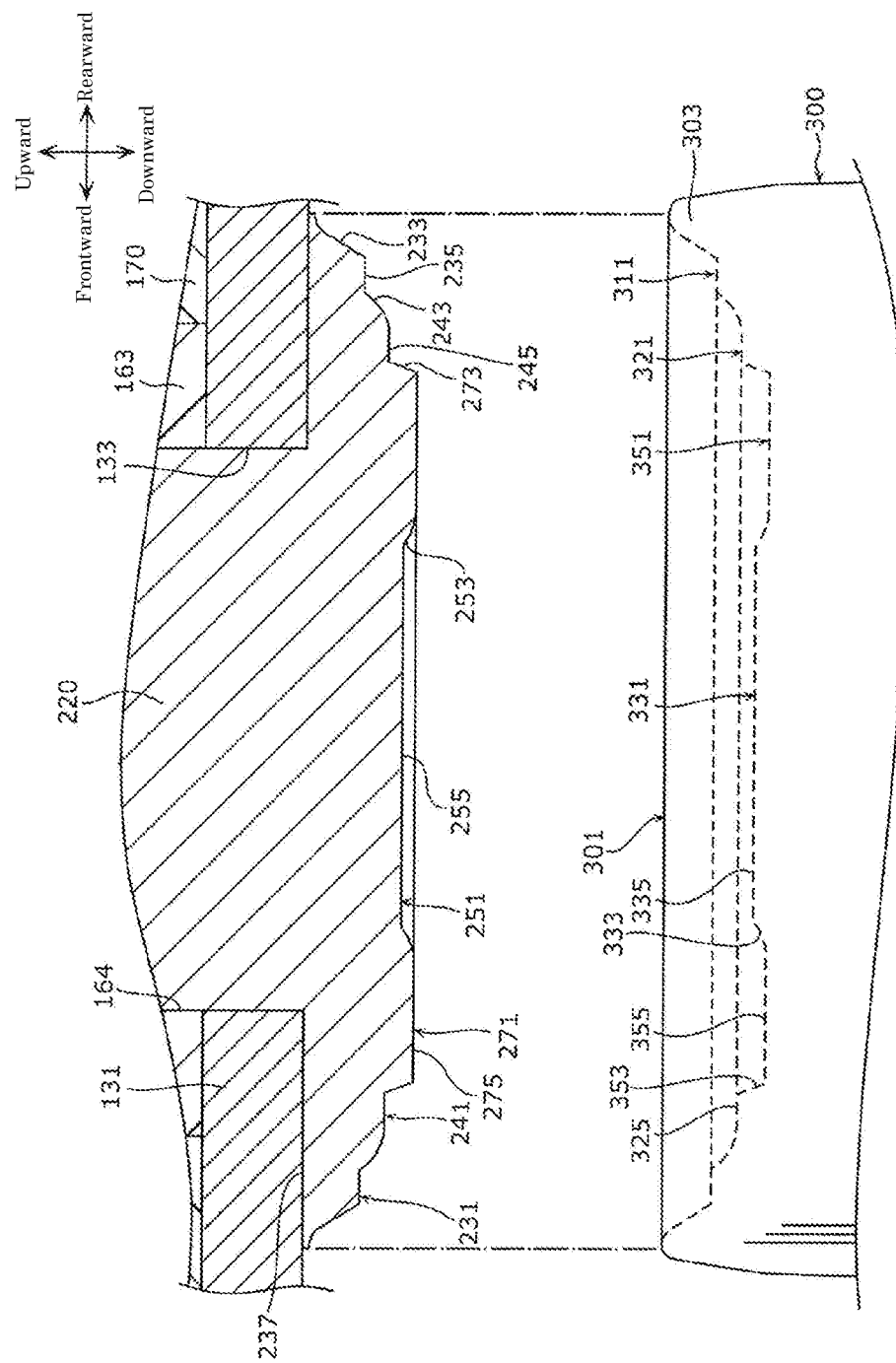
FIG. 11 is a partially enlarged cross-sectional view showing a swaged portion of an energy storage device according to a modification 2 of the embodiment.

FIG. 11 is a partially-enlarged cross-sectional view showing a swaged portion 230 of the energy storage device 10 according to the modification 2 of the embodiment.

As shown in FIG. 11, the swaged portion 230 further includes a third convex portion 271 in addition to a first convex portion 231, a second convex portion 241, and a first concave portion 251.

A second flat surface portion 245 of the second convex portion 241 forms an annular flat surface when the swaged portion 230 is viewed from below to above. It is preferable that the second flat surface portion 245 be formed concentrically with the first flat surface portion 235.

The third convex portion 271 is positioned at an inner peripheral side of the second convex portion 241, and is formed at a center region of the second flat surface portion 245 of the second convex portion 241. The third convex portion 271 has a disc shape having a diameter smaller than the second convex portion 241 when the swaged portion 230 is viewed from below to above. It is preferable that respective axes of the first convex portion 231, the second convex portion 241, and the third convex portion 271 agree with an axis of the shaft portion 220.

The third convex portion 271 has a fifth tapered surface 273 and a fifth flat surface portion 275. The fifth tapered surface 273 is formed such that an outer diameter of the fifth tapered surface 273 is gradually decreased toward a side opposite to the shaft portion 220 from an inner peripheral side of the second flat surface portion 245 to the fifth flat surface portion 275. The fifth flat surface portion 275 is an annular flat surface surrounding a circumference of the first concave portion 251 when the swaged portion 230 is viewed from below to above. It is preferable that the fifth flat surface portion 275 be formed concentrically with the first flat surface portion 235 and the second flat surface portion 245. The fifth flat surface portion 275 is a flat surface which is formed from a lower end edge of the fifth tapered surface 273 to the first concave portion 251.

In the method for manufacturing the energy storage device 10, the pressing surface 301 of the punch 300 of a swaging machine has a punch-side third concave portion 351 in addition to a punch-side first concave portion 311, a punch-side second concave portion 321, and a punch-side first convex portion 331.

The punch-side third concave portion 351 has a punch-side fifth tapered surface 353, a punch-side fifth flat surface portion 355, and a punch-side first convex portion 331.

The punch-side third concave portion 351 is concaved toward a side opposite to the pressing direction of the punch 300 more than the punch-side second concave portion 321, and is formed into a circular shape having a smaller diameter than the punch-side second concave portion 321 when the pressing surface 301 is viewed from above to below. The punch-side fifth tapered surface 353 is formed such that an inner diameter of the punch-side fifth tapered surface 353 is gradually decreased toward a side opposite to the pressing direction of the punch 300 from an inner peripheral side of the punch-side fifth flat surface portion 355. The punch-side fifth tapered surface 353 is an inner peripheral surface of the punch-side third concave portion 351. The punch-side fifth flat surface portion 355 is a bottom portion of the punch-side third concave portion 351, and has an annular shape surrounding the circumference of the punch-side first convex portion 331.

Also in the modification 2 of the embodiment, with the use of the punch 300, when the tip portion of the shaft portion 220 of the positive electrode terminal 201 is swaged from a state shown in FIG. 11, the swaged portion 230 and the body portion 210 fasten a current collector body portion 131 of a positive electrode current collector 130, a positive electrode first sealing member 160, a positive electrode second sealing member 170 and a lid body 110 to each other by sandwiching these constitutional elements therebetween in the vertical direction. With such a configuration, the first annular convex portion 163a and the second annular convex portion 163b of the positive electrode first sealing member 160 are collapsed by compression so that a distance between the lid body 110 and the current collector body portion 131 is narrowed. In this manner, the swaged portion 230 is formed in an inversed shape with respect to the pressing surface 301 of the punch 300.

[Manner of Operation and Advantageous Effects]

Next, the manner of operation and the advantageous effects of the method for manufacturing the energy storage device 10 and the energy storage device 10 according to the modification 2 of the embodiment are described.

The modification 2 of the embodiment also can acquire substantially the same advantageous effects as the above-mentioned embodiment, and a force which acts in swaging the shaft portion 220 by the punch 300 minimally acts in a direction intersecting with the upper direction. Accordingly, the keeping of airtightness of the energy storage device 10 can be enhanced.

Modification 3 of Embodiment

Hereinafter, a configuration of an energy storage device 10 according to a modification 3 of the embodiment is described with reference to FIG. 12.

In the modification 3 of the embodiment, other configurations of the energy storage device 10 are substantially equal to the corresponding configurations of the energy storage device 10 according to the embodiment and hence, identical constitutional elements are given the same symbols, and their detailed description is omitted.

Figure 12:
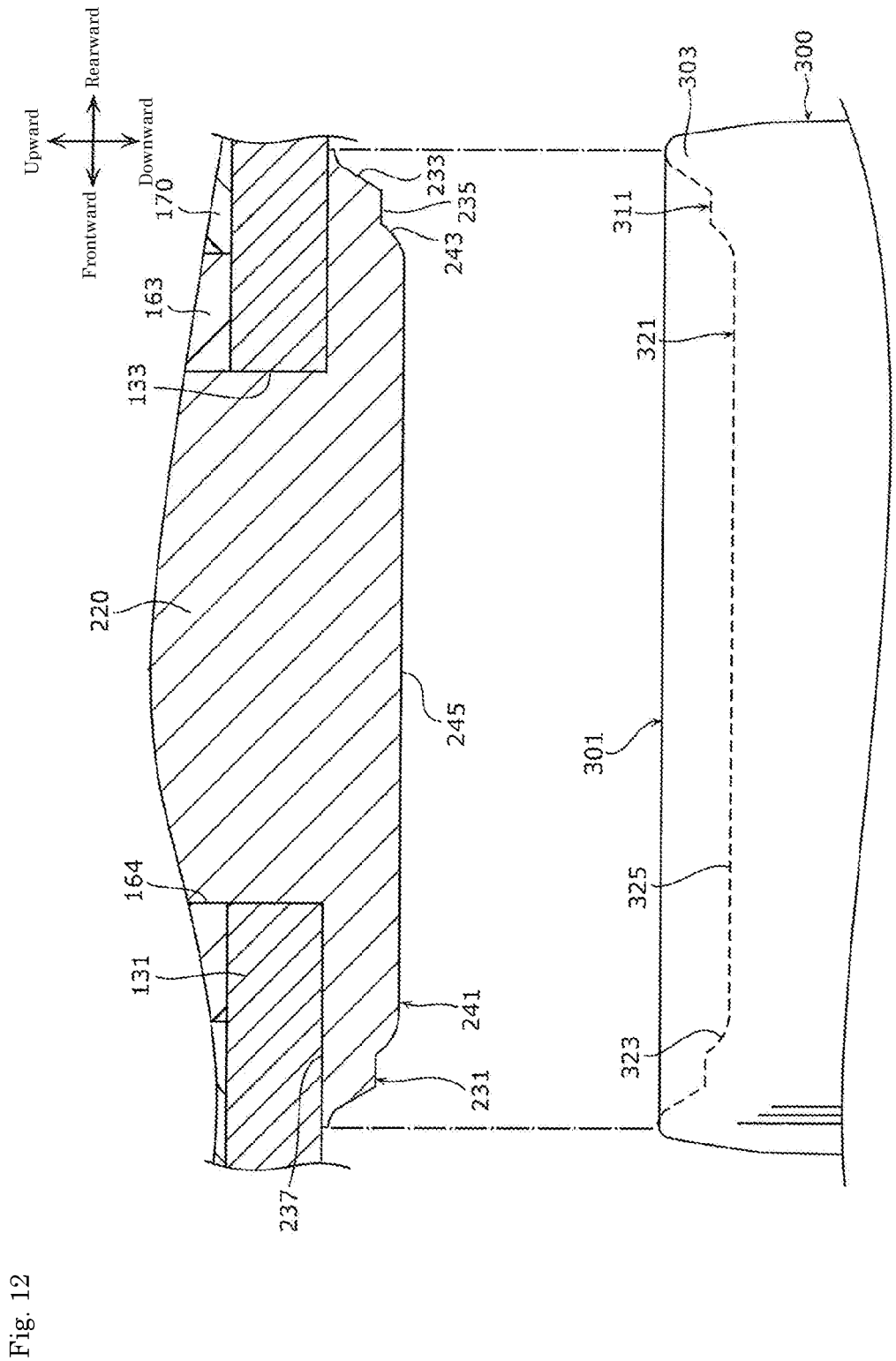
FIG. 12 is a partially enlarged cross-sectional view showing a swaged portion of an energy storage device according to a modification 3 of the embodiment.

FIG. 12 is a partially-enlarged cross-sectional view showing a swaged portion 230 of the energy storage device 10 according to the modification 3 of the embodiment.

As shown in FIG. 12, a portion which corresponds to the first concave portion 251 employed in the embodiment is not formed on a second convex portion 241 of the swaged portion 230. A second flat surface portion 245 of the second convex portion 241 forms a circular flat surface when the swaged portion 230 is viewed from below to above.

In the method for manufacturing the energy storage device 10, a portion which corresponds to the punch-side first convex portion 331 employed in the embodiment is not formed on a punch-side second concave portion 321 of a pressing surface 301 of a punch 300 of a swaging machine.

A punch-side second flat surface portion 325 of the punch-side second concave portion 321 of the punch 300 is a circular flat surface when the pressing surface 301 is viewed from above to below.

Also in the modification 3 of the embodiment, with the use of the punch 300, when a tip portion of a shaft portion 220 of a positive electrode terminal 201 is swaged from a state shown in FIG. 7, the swaged portion 230 and a body portion 210 fasten a current collector body portion 131 of a positive electrode current collector 130, a positive electrode first sealing member 160, a positive electrode second sealing member 170 and a lid body 110 to each other by sandwiching these constitutional elements therebetween in the vertical direction. With such a configuration, a first annular convex portion 163a and a second annular convex portion 163b of a positive electrode first sealing member 160 are collapsed by compression so that a distance between the lid body 110 and the current collector body portion 131 is narrowed. In this manner, the swaged portion 230 is formed in an inversed shape with respect to the pressing surface 301 of the punch 300.

Also the modification 3 of the embodiment can acquire substantially the same manner of operation and advantageous effects as the embodiment with respect to the manner of operation and other advantageous effects.

Modification 4 of Embodiment

Hereinafter, the configuration of an energy storage device 10 according to a modification 4 of the embodiment is described with reference to FIG. 13.

In the modification 4 of the embodiment, other configurations of the energy storage device 10 are substantially equal to the corresponding configurations of the energy storage device 10 according to the embodiment and hence, identical constitutional elements are given the same symbols, and their detailed description is omitted.

Figure 13:
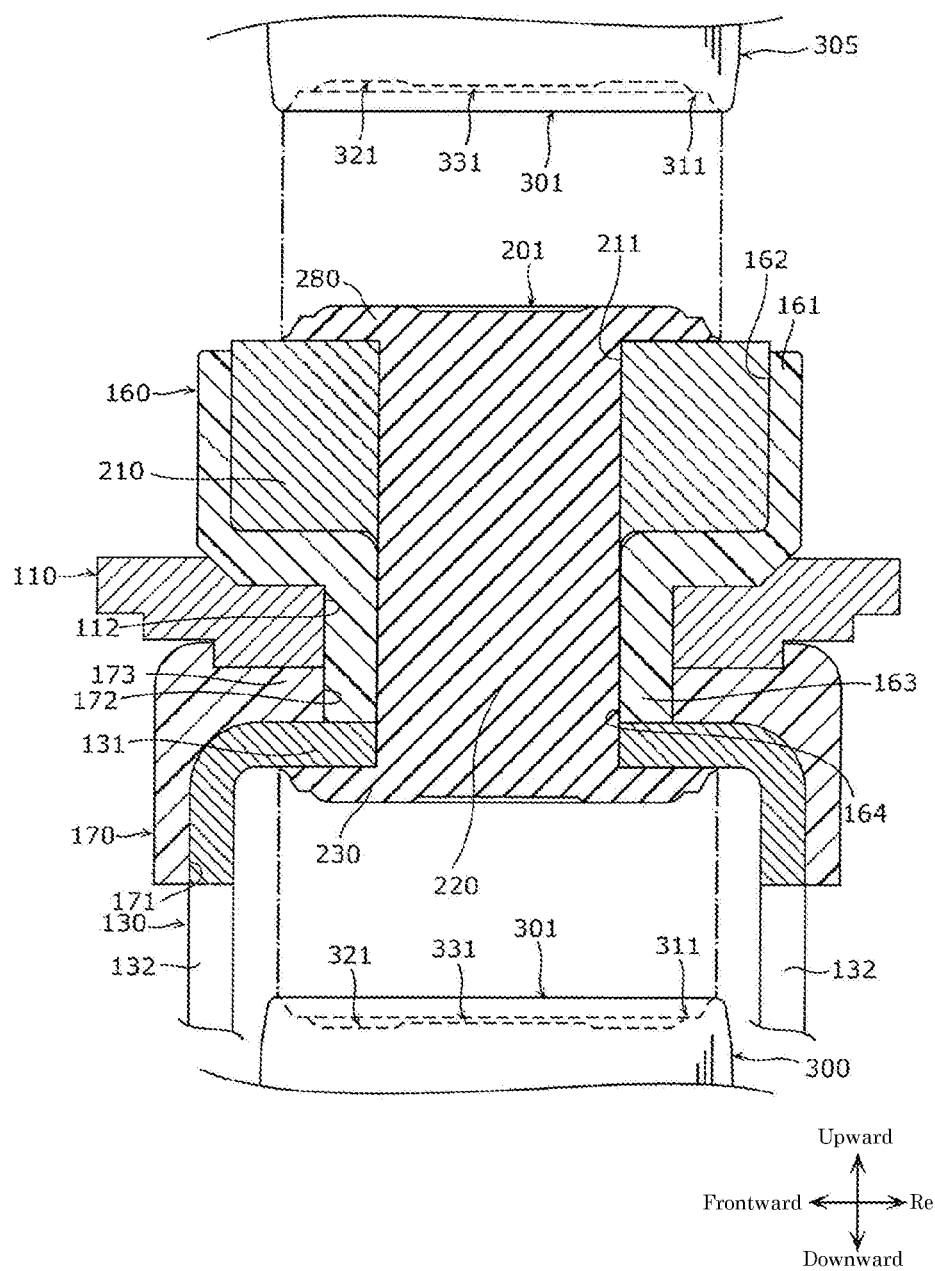
FIG. 13 is a partially enlarged cross-sectional view showing an energy storage device according to a modification 4 of the embodiment.

FIG. 13 is a partially-enlarged cross-sectional view showing the energy storage device 10 according to the modification 4 of the embodiment.

As shown in FIG. 13, a through hole 211 into which a circular columnar-shaped shaft portion 220 is inserted is formed in a body portion 210. The through hole 211 of the body portion 210 has a circular shape having a diameter equal to a diameter of a through hole 164 formed in a circular cylindrical portion 163 and a diameter of a through hole 133 formed in a positive electrode current collector 130. The through hole 211 is disposed to be continuous with the through hole 164 formed in the circular cylindrical portion 163, and the shaft portion 220 of a positive electrode terminal 201 is inserted into the through holes 211, 164, 133.

The positive electrode terminal 201 includes a swaged portion 280 as an integral portion thereof in addition to the body portion 210, the shaft portion 220, and a swaged portion 230.

By swaging both ends of the shaft portion 220, the shaft portion 220 fixes the body portion 210, a positive electrode first sealing member 160, a positive electrode second sealing member 170, and the positive electrode current collector 130 to the lid body 110. A back surface of the swaged portion 280 is brought into close contact with an upper surface (surface) of the body portion 210. The swaged portion 280 penetrates a lid body 110 and projects upward (one example of a predetermined direction) from a surface of the body portion 210. The swaged portion 230 and the swaged portion 280 fasten the body portion 210, a current collector body portion 131 of the positive electrode current collector 130, the positive electrode first sealing member 160, the positive electrode second sealing member 170, and the lid body 110 to each other by sandwiching these constitutional elements therebetween in the vertical direction.

In the method for manufacturing the energy storage device 10, the swaging machine has a punch 300 and a punch 305. The punch 305 has the same configuration as the punch 300, and is disposed symmetrically with respect to a plane defined in the longitudinal direction and in the vertical direction with respect to the punch 300.

The swaged portion 280 is disposed in plane symmetry with the swaged portion 230 with respect to a plane defined in the longitudinal direction and in the lateral direction. The swaged portion 280 is swaged by substantially the same manufacturing method as the swaged portion 230. The swaged portion 230 and the swaged portion 280 may be formed simultaneously or may be formed at different timings. However, from a viewpoint of manufacturing the energy storage device, it is preferable that the swaged portion 280 be formed after the swaged portion 230 is formed.

The configuration may be adopted where the swaged portion 230 is not formed, and the positive electrode current collector 130 and the shaft portion 220 are integrally formed with each other. In this case, the positive electrode current collector 130 and the shaft portion 220 may be made of the same material, or may be formed by integrally connecting separate members to each other. Also in this case, it is preferable that a first annular convex portion 163a and a second annular convex portion 163b be formed on a positive electrode first sealing member 160.

Also the modification 4 of the embodiment can acquire substantially the same manner of operation and advantageous effects as the embodiment with respect to other manner of operation and advantageous effects.

Other Modifications

The method for manufacturing an energy storage device and the energy storage device according to the present invention have been described with reference to the embodiment and the modifications 1 to 4 of the embodiment. However, the present invention is not limited to the above-mentioned embodiment and modifications 1 to 4 of the embodiment.

In the above-mentioned embodiment and modifications of the embodiment, the depth of the first concave portion 251 (or the second concave portion 261 in the modification 1) does not reach the first convex portion 231. However, also in this case, a concave portion may be further formed in the first concave portion 251 (or the second concave portion 261 in the modification 1), and the concave portion may reach the first convex portion 231. This is because there may be a case where the concave portion which is formed preliminarily before swaging remains as it is without being pressed by the punch.

In the above-mentioned embodiment and the modifications of the embodiment (excluding the modification 1), a depth of the first concave portion 251 may reach the first convex portion 231. However, it is preferable that the depth of the first concave portion 251 do not reach the shaft portion 220 disposed in the through hole 133 of the positive electrode current collector 130. That is, although the third flat surface portion 255 may be formed on the first convex portion 231, it is preferable that the third flat surface portion 255 do not reach the shaft portion 220 in the through hole 133.

In the modification 1 of the above-mentioned embodiment, a depth of the second concave portion 261 may reach the first convex portion 231. That is, the first concave portion 251 and the second concave portion 261 may be formed on the first convex portion 231 and the second convex portion 241 respectively. However, it is preferable that the first concave portion 251 and the second concave portion 261 not be formed deep enough in the shaft portion 220 positioned in the through hole 133. That is, although the fourth flat surface portion 265 may be formed on the first convex portion 231, it is preferable that the fourth flat surface portion 265 do not reach the shaft portion 220 in the through hole 133.

In the above-mentioned embodiment and the modifications of the embodiment, the punch-side first concave portion, the punch-side second concave portion, and the punch-side third concave portion are formed on the pressing surface of the punch. However, the number of concave portions formed on the pressing surface of the punch may be increased. The first convex portion, the second convex portion, and the third convex portion are formed on the swaged portion having an inversed shape with respect to the punch. However, the number of convex portions formed on the swaged portion may be increased.

The punch-side first convex portion and the punch-side second convex portion are formed on the pressing surface of the punch. However, the number of convex portions formed on the pressing surface of the punch may be further increased. The first concave portion and the second concave portion are formed on the swaged portion having an inversed shape with respect to the punch. However, the number of concave portions formed on the swaged portion may be further increased.

The positive electrode terminal which is an integral part formed of the body portion and the shaft portion is exemplified. However, the positive electrode terminal may be formed such that the body portion and the shaft portion are formed as separate portions, and the body portion and the shaft portion are integrally formed with each other by a known joining method such as swaging, press-fitting, welding or the like.

In the above-mentioned embodiment, the specific configuration of portions which are the technical features of the present invention have been described by exemplifying the configuration on the positive electrode side. However, it is needless to say that substantially the same configuration is also applied to the negative electrode side. The configuration on the positive electrode side and the configuration on the negative electrode side may differ from each other provided that these configurations do depart from the gist of the present invention.

The punch-side first concave portion, the punch-side second concave portion, the punch-side third concave portion, the punch-side first convex portion, the punch-side second convex portion of the punch respectively have a conical shape. However, these portions may have a circular columnar shape.

The first flat surface portion, the second flat surface portion, the third flat surface portion, the fourth flat surface portion, and the fifth flat surface portion of the swaged portion may not be formed into a flat surface and may be formed into an inclined surface or a curved surface. The punch-side first flat surface portion, the punch-side second flat surface portion, the punch-side third flat surface portion, the punch-side fourth flat surface portion, and the punch-side fifth flat surface portion of the punch may not be formed into a flat surface, and may be formed into an inclined surface.

The first tapered surface, the second tapered surface, the third tapered surface, the fourth tapered surface, and the fifth tapered surface of the swaged portion, and the punch-side first tapered surface, the punch-side second tapered surface, the punch-side third tapered surface, the punch-side fourth tapered surface, and the punch-side fifth tapered surface of the punch may not be formed into a straight line shape as viewed in cross section, and may be formed into a curved shape as viewed in cross section.

In the above-mentioned embodiment and the modifications of the embodiment, the first annular convex portion (sealing portion) and the second annular convex portion (sealing portion) are integrally formed on the positive electrode first sealing member. However, the first annular convex portion and the second annular convex portion may not be integrally formed on the positive electrode first sealing member, and may be formed as members separate from the positive electrode first sealing member. The first annular convex portion and the second annular convex portion may be formed on the positive electrode second sealing member. The configuration may be adopted where an annular convex portion (sealing portion) is formed on the case, the terminal portion, or the current collector.

The first annular convex portion and the second annular convex portion may not be disposed at the positions corresponding to the first flat surface portion of the first concave portion of the punch. However, it is preferable that the first annular convex portion and the second annular convex portion be disposed at the positions corresponding to the flat surface portion (not at the positions corresponding to the inclined surface) of the pressing surface of the punch.

Other configurations such as configurations acquired by applying various modifications which those who are skilled in the art conceive to the embodiment or the modifications 1 to 4 of the embodiment, and the configurations acquired by arbitrarily combining the constitutional elements and functions described in the embodiment and the modifications 1 to 4 of the embodiment are included in the scope of the present invention without departing from the gist of the present invention.

INDUSTRIAL APPLICABILITY

The present invention is applicable to an energy storage device such as a lithium ion secondary battery or the like.

DESCRIPTION OF REFERENCE SIGNS

10: energy storage device
100: case
110: lid body
111: case body
112, 133, 164, 172, 211: through hole
120: negative electrode current collector (current collector)
130: positive electrode current collector (current collector)
131: current collector body portion
132: electrode assembly connecting portion
140: electrode assembly
150: negative electrode first sealing member
152, 162, 171: concave portion
160: positive electrode first sealing member
163: circular cylindrical portion
163a: first annular convex portion (sealing portion)
163b: second annular convex portion (sealing portion)
165: first annular deformation portion (annular deformation portion)
167: second annular deformation portion (annular deformation portion)
170: positive electrode second sealing member
173: bottom portion
200: negative electrode terminal (terminal portion)
201: positive electrode terminal (terminal portion)
210: body portion
220: shaft portion (connecting portion)

230, 280: swaged portion
231: first convex portion
233: first tapered surface
235: first flat surface portion (flat surface portion)
237: contact surface
241: second convex portion
243: second tapered surface
245: second flat surface portion
251: first concave portion (concave portion)
253: third tapered surface
255: third flat surface portion
261: second concave portion (concave portion)
263: fourth tapered surface
265: fourth flat surface portion
271: third convex portion
273: fifth tapered surface
275: fifth flat surface portion
300, 305: punch
301: pressing surface
303: side wall
311: punch-side first concave portion
313: punch-side first tapered surface
315: punch-side first flat surface portion
321: punch-side second concave portion
323: punch-side second tapered surface
325: punch-side second flat surface portion
331: punch-side first convex portion
333: punch-side third tapered surface
335: punch-side third flat surface portion
341: punch-side second convex portion
343: punch-side fourth tapered surface
345: punch-side fourth flat surface portion
351: punch-side third concave portion
353: punch-side fifth tapered surface
355: punch-side fifth flat surface portion

The invention claimed is:

1. An energy storage device, including:
a case;
a terminal portion;
a current collector; and
a connecting portion which penetrates the case and connects the terminal portion and the current collector,
wherein the connecting portion includes a swaged portion which penetrates the terminal portion or the current collector and projects in a predetermined direction from the terminal portion or the current collector,
wherein the swaged portion includes:
a first convex portion which protrudes in the predetermined direction and includes a first tapered surface in an outer periphery of the first convex portion; and
a second convex portion which protrudes in the predetermined direction more than the first convex portion at an inner peripheral side of the first convex portion,
wherein an annular flat surface portion extends substantially parallel to the case and is formed between a circumference of the first convex portion and a circumference of the second convex portion, and
wherein the first tapered surface is formed such that a diameter of the outer periphery of the first convex portion is gradually decreased as the first convex portion extends away from the case.

2. A method for manufacturing the energy storage device of claim 1 comprising: a swaging in which, the method comprising:
a swaged portion is formed by swaging a tip portion, penetrating the terminal portion or the current collector and projecting in a predetermined direction from the terminal portion or the current collector, of the connecting portion,
wherein, in the swaging, the tip portion of the connecting portion is swaged by a punch which includes a pressing surface, the pressing surface including a first concave portion which is concaved in the predetermined direction and a second concave portion which is concaved in the predetermined direction more than the first concave portion at an inner peripheral side of the first concave portion.

3. The method for manufacturing the energy storage device according to claim 1, wherein, in the swaging, the tip portion of the connecting portion is swaged by the punch which includes the pressing surface, the pressing surface including a convex portion in a central region of the second concave portion.

4. The method for manufacturing the energy storage device according to claim 1, wherein, in the swaging, the tip portion of the connecting portion is swaged by the punch which includes the pressing surface on which an annular flat surface portion is formed at a circumference of the second concave portion inside the first concave portion.

5. The method for manufacturing the energy storage device according to claim 1, wherein the energy storage device further includes a sealing portion to keep airtightness between the terminal portion and the current collector, and
wherein, in the swaging, the sealing portion is placed at a position corresponding to the fiat surface portion of the first concave portion and then the tip portion of the connecting portion is swaged.

6. The energy storage device according to claim 1, wherein the second convex portion includes a second tapered surface in an entire outer periphery of the second convex portion.

7. The energy storage device according to claim 1, wherein the first tapered surface is formed such that the diameter of the outer periphery of the first convex portion decreases as the first convex portion extends, in the predetermined direction, away from a contact surface of the first convex portion with a body portion of the current collector.

8. The energy storage device according to claim 1, wherein the predetermined direction is a direction away from a contact surface of the first convex portion with a body portion of the current collector.

9. The energy storage device according to claim 1, wherein the swaged portion penetrates the current collector and projects in the predetermined direction from the current collector.

10. The energy storage device according to claim 1, wherein the first convex portion includes the first tapered surface in an entire outer periphery of the first convex portion.

11. The energy storage device according to claim 1, wherein the first convex portion is disposed in an outer periphery of the swaged portion.

12. The energy storage device according to claim 3, wherein the first convex portion is disposed in an entire outer periphery of the swaged portion.

13. An energy storage device, including: a case;
a terminal portion;
a current collector; and
a connecting portion which penetrates the case and connects the terminal portion and the current collector,
wherein the connecting portion includes a swaged portion which penetrates the terminal portion or the current collector and projects in a predetermined direction from the terminal portion or the current collector, wherein the swaged portion includes:
- a first convex portion which protrudes in the predetermined direction and. includes a first tapered surface in an outer periphery of the first convex portion; and
- a second convex portion which protrudes in the predetermined direction more than the first convex portion at an inner peripheral side of the first convex portion, wherein an annular fiat surface portion extends substantially parallel to the case and is formed between a circumference of the first convex portion and a circumference of the second convex portion, and wherein the first tapered surface is formed such that a diameter of the outer periphery of the first convex portion decreases as the first convex portion extends, in the predetermined direction, away from a contact surface of the first convex portion with a body portion of the current collector.

14. The energy storage device according to claim 13, wherein the second convex portion includes a second tapered surface in an entire outer periphery of the second convex portion.

15. The energy storage device according to claim 13, wherein the predetermined direction is a direction away from the contact surface of the first convex portion with the body portion of the current collector.

16. The energy storage device according to claim 13., wherein the swaged portion penetrates the current collector and projects in the predetermined direction from the current collector.

17. The energy storage device according to claim 13, wher the first convex portion is disposed in an outer periphery of the swaged portion.

18. The energy storage device according to claim 17, wherein the first convex portion is disposed in an entire outer periphery of the swaged portion.

19. The energy storage device according to claim 13, wherein the first convex portion includes the first tapered surface in an entire outer periphery of the first convex portion.

* * * * *